(12) United States Patent
Sathyanarayana et al.

(10) Patent No.: US 9,960,524 B2
(45) Date of Patent: May 1, 2018

(54) SLIM LINE WHILE IN USE COVER AND METHODS FOR MAKING AND USING THE SAME

(71) Applicant: Sigma Electric Manufacturing Corporation, Garner, NC (US)

(72) Inventors: Ashok Alilughatta Sathyanarayana, Pune (IN); Vinayak Manohar Chavan, Pune (IN); Yuvraj Totaram Khodape, Pune (IN); Shriram Ramesh Divekar, Pune (IN)

(73) Assignee: SIGMA ELECTRIC MANUFACTURING CORPORATION, Garner, NC (US)

( * ) Notice: Subject to any disclaimer, the term of this patent is extended or adjusted under 35 U.S.C. 154(b) by 0 days. days.

(21) Appl. No.: 15/434,579

(22) Filed: Feb. 16, 2017

(65) Prior Publication Data

US 2017/0237198 A1 Aug. 17, 2017

Related U.S. Application Data

(60) Provisional application No. 62/295,840, filed on Feb. 16, 2016.

(51) Int. Cl.
| | |
|---|---|
| *H01R 13/52* | (2006.01) |
| *H01R 25/00* | (2006.01) |
| *H01R 31/06* | (2006.01) |
| *H01R 43/26* | (2006.01) |
| *H02G 3/10* | (2006.01) |
| *H02G 3/18* | (2006.01) |

(52) U.S. Cl.
CPC ..... *H01R 13/5213* (2013.01); *H01R 13/5202* (2013.01); *H01R 25/006* (2013.01); *H01R 31/06* (2013.01); *H01R 43/26* (2013.01); *H02G 3/10* (2013.01); *H02G 3/18* (2013.01)

(58) Field of Classification Search
CPC .............. H01R 13/5213; H01R 25/006; H01R 25/3106
USPC .......................................... 439/521
See application file for complete search history.

(56) References Cited

U.S. PATENT DOCUMENTS

| | | | |
|---|---|---|---|
| 1,648,582 A | 11/1927 | Dodge | |
| 2,652,546 A * | 9/1953 | Christner | ............... H01R 35/04 439/651 |
| 4,372,629 A * | 2/1983 | Propst | ................... A47B 21/06 248/52 |
| 4,607,136 A | 8/1986 | Thomas | |

(Continued)

FOREIGN PATENT DOCUMENTS

| | | |
|---|---|---|
| CA | 2167016 A1 | 7/1996 |
| CA | 2659127 A1 | 9/2009 |

*Primary Examiner* — Alexander Gilman
(74) *Attorney, Agent, or Firm* — Cantor Colburn LLP

(57) ABSTRACT

A while in use cover assembly includes a lid hingedly attached to a base having a back wall; a current member attached to the base, wherein the current member comprises a face with blade apertures configured to receive a power cord plug; and a orientable adaptor attached to the current member, wherein the orientable adaptor is symmetrical about a center line and wherein the orientable adaptor allows the current member to have a constant orientation within the base; and wherein the while in use cover assembly is configured to be attached to an outlet socket.

20 Claims, 34 Drawing Sheets

(56) References Cited

U.S. PATENT DOCUMENTS

| | | | |
|---|---|---|---|
| 4,743,999 A * | 5/1988 | Hames | H01R 13/6666 361/111 |
| 5,399,093 A | 3/1995 | Schneider et al. | |
| 5,731,544 A | 3/1998 | Burck et al. | |
| 5,763,831 A | 6/1998 | Shotey et al. | |
| 5,967,836 A * | 10/1999 | Bailey | H01R 24/76 439/248 |
| 6,028,267 A * | 2/2000 | Byrne | H01R 13/518 174/55 |
| 6,127,630 A * | 10/2000 | McKenzie | H02G 3/14 174/58 |
| 6,315,617 B1 * | 11/2001 | Al-Sabah | H01R 13/6666 439/652 |
| 6,441,307 B1 | 8/2002 | Shotey et al. | |
| 6,544,069 B1 * | 4/2003 | Enriquez, Sr. | H01R 35/04 439/534 |
| 6,583,358 B1 | 6/2003 | Shotey et al. | |
| 6,586,672 B2 | 7/2003 | Kobus et al. | |
| 6,642,453 B2 | 11/2003 | Shotey et al. | |
| 6,700,063 B2 | 3/2004 | Shotey et al. | |
| 6,723,922 B1 | 4/2004 | Shotey et al. | |
| 6,770,816 B2 | 8/2004 | Shotey et al. | |
| 6,872,887 B2 | 3/2005 | Shotey et al. | |
| 6,960,721 B2 | 11/2005 | Shotey et al. | |
| 6,979,777 B2 | 12/2005 | Marcou et al. | |
| 6,987,225 B2 | 1/2006 | Shotey et al. | |
| 7,121,834 B2 * | 10/2006 | Gerard | H01R 35/04 439/13 |
| 7,176,379 B2 | 2/2007 | Shotey et al. | |
| 7,381,894 B1 | 6/2008 | Shotey et al. | |
| 7,396,996 B1 | 7/2008 | Shotey et al. | |
| 7,482,537 B1 * | 1/2009 | Shotey | H02G 3/14 174/66 |
| 7,540,768 B1 * | 6/2009 | Wang | H01R 13/743 439/536 |
| 7,541,540 B1 | 6/2009 | Shotey et al. | |
| 7,554,037 B1 | 6/2009 | Shotey et al. | |
| 7,598,452 B1 * | 10/2009 | Shotey | H01R 13/5213 174/66 |
| 7,619,163 B1 | 11/2009 | Shotey et al. | |
| 7,626,121 B1 * | 12/2009 | Cleghorn | H02G 3/14 174/53 |
| 7,763,798 B1 | 7/2010 | Shotey et al. | |
| 7,763,799 B2 * | 7/2010 | Johnson | H02G 3/088 174/481 |
| 7,799,993 B2 | 9/2010 | Drane et al. | |
| 7,880,086 B1 | 2/2011 | Shotey et al. | |
| 7,939,758 B1 | 5/2011 | Shotey | |
| 7,967,616 B1 * | 6/2011 | Lee | H01R 35/02 439/131 |
| 7,977,572 B1 | 7/2011 | Shotey et al. | |
| 8,007,295 B2 * | 8/2011 | Lin | A47B 21/06 439/131 |
| 8,017,865 B1 * | 9/2011 | Baldwin | H02G 3/14 174/53 |
| 8,096,817 B2 * | 1/2012 | Lee | H01R 29/00 439/104 |
| 8,103,242 B2 | 1/2012 | Dickinson | |
| 8,277,233 B2 * | 10/2012 | Su | H01R 27/00 439/131 |
| 8,314,335 B1 | 11/2012 | Shotey et al. | |
| 8,348,683 B2 * | 1/2013 | Row | H02G 3/12 174/66 |
| 8,512,056 B2 * | 8/2013 | Wen | H01R 31/065 439/172 |
| 8,704,091 B1 | 4/2014 | Shotey et al. | |
| 8,986,022 B2 * | 3/2015 | Dinh | H01R 13/6395 439/131 |
| 9,166,388 B2 | 10/2015 | Shotey et al. | |
| 9,312,653 B2 * | 4/2016 | Byrne | H01R 27/02 |
| 2006/0068608 A1 * | 3/2006 | McFadden | H01R 31/06 439/22 |
| 2010/0124849 A1 * | 5/2010 | Winstanley | H01R 13/44 439/620.21 |
| 2011/0117760 A1 * | 5/2011 | Winstanley | H01R 13/701 439/136 |
| 2013/0237088 A1 * | 9/2013 | Sathyanarayana | H01R 25/006 439/521 |

* cited by examiner

SLIM LINE WHILE IN USE COVER AND METHODS FOR MAKING AND USING THE SAME

CROSS REFERENCE TO RELATED APPLICATIONS

This application is a non-provisional of and claims priority to U.S. Application Ser. No. 62/295,840, filed Feb. 16, 2016, which is incorporated herein by reference in its entirety.

TECHNICAL FIELD

The instant application relates to while in use covers for protecting electrical outlets and plugs attached thereto from elements, such as water (e.g., rain, snow), dust, and/or other debris.

BACKGROUND

Electrical boxes are prone to exposure to water and other contaminants from the outside when mounted on exterior walls of various structures. While in use cover generally refers to a cover allowing an electrical plug to be plugged into an outlet while the cover is closed to protect the outlet and plug from the elements including weather (e.g., rain, snow), dust, and/or other debris. Typically, to allow a cover to close while the outlet is in use, the base and/or lid need to be deep enough to allow the cover to close without interfering with the plug when the plug is plugged into the outlet. Such devices are generally termed "bubble covers", which are deep enough to allow room for both the cord and the plug when the cover is closed. Such a design, however, poses aesthetic problems in that the covers protrude three or more inches from the exterior of a structure, which can be visually displeasing.

Expandable outlet covers include at least two inter-fitting members that enable the cover to be retracted to the wall when not in use and expanded to increase the depth of the outlet cover and allow a plug to be plugged into the outlet when the cover is closed. However, such covers fail to address the overall dimensions of the cover when in use, such that the cover and outlet expand to 3 inches to 3.5 inches when in use. Flexible outlet covers include an electrical device cover configured to mount over an electrical device including a lid having a flexible membrane. The lid is configured to expand through the flexible membrane to an expanded position to accommodate an electrical connector coupled with the electrical device. However, the lid can be difficult to open and the lid expands to at least 2.5 inches when in use, and thus, also fails to address the overall dimensions of the lid when in use.

There remains an unfulfilled need to provide a while in use cover that addresses the problem of bulky, unsightly while in use covers, while still providing protection from the elements.

BRIEF SUMMARY

Disclosed herein are while in use covers and methods for making and using the same.

A while in use cover assembly comprises: a lid hingedly attached to a base having a back wall; a current member attached to the base, wherein the current member comprises a face with blade apertures configured to receive a power cord plug; and a orientable adaptor attached to the current member, wherein the orientable adaptor is symmetrical about a center line and wherein the orientable adaptor allows the current member to have a constant orientation within the base; and wherein the while in use cover assembly is configured to be attached to an outlet socket.

A while in use cover assembly comprises: a lid hingedly attached to a base having a back wall; a current member attached to the base, wherein the current member comprises a plug receiving portion and an orientable adaptor receiving portion, wherein the orientable adaptor receiving portion is disposed perpendicularly to the plug receiving portion; and an orientable adaptor attached to the orientable adaptor receiving portion of the current member, wherein the orientable adaptor is symmetrical about a center line and wherein the orientable adaptor allows the current member to have a constant orientation within the base; wherein the while in use cover assembly has a constant depth, when the lid is closed, when in use and when not in use; and wherein, when the while in use cover assembly is in use, a power cord plug is attached to the current member, and a power cord extending from the power cord plug extends through a power cord exit while bending toward the back wall or toward the lid by less than or equal to 15 degrees as measured from an angle parallel with an axis A.

A method of using a while in use cover assembly comprises: opening a lid of while in use cover assembly, wherein the while in use cover assembly comprises a lid hingedly attached to a base having a back wall; a current member attached to the base, wherein the current member comprises a face with blade apertures configured to receive a power cord plug; and an orientable adaptor attached to the current member, wherein the orientable adaptor is symmetrical about a center line and wherein the orientable adaptor allows the current member to have a constant orientation within the base; attaching the orientable adaptor to a socket, wherein the orientable adaptor is disposed according to a position of a grounding terminal on the socket; attaching the current member to the orientable adaptor; and attaching the while in use cover assembly to a junction box.

These and other features of the while in use cover and method of making will be understood from the drawings and description below.

BRIEF DESCRIPTION OF THE DRAWINGS

Refer now to the figures, which are merely exemplary, not limiting, and wherein like elements are numbered alike, and are not necessarily re-described in relation to each figure.

DETAILED DESCRIPTION

Figure 1:
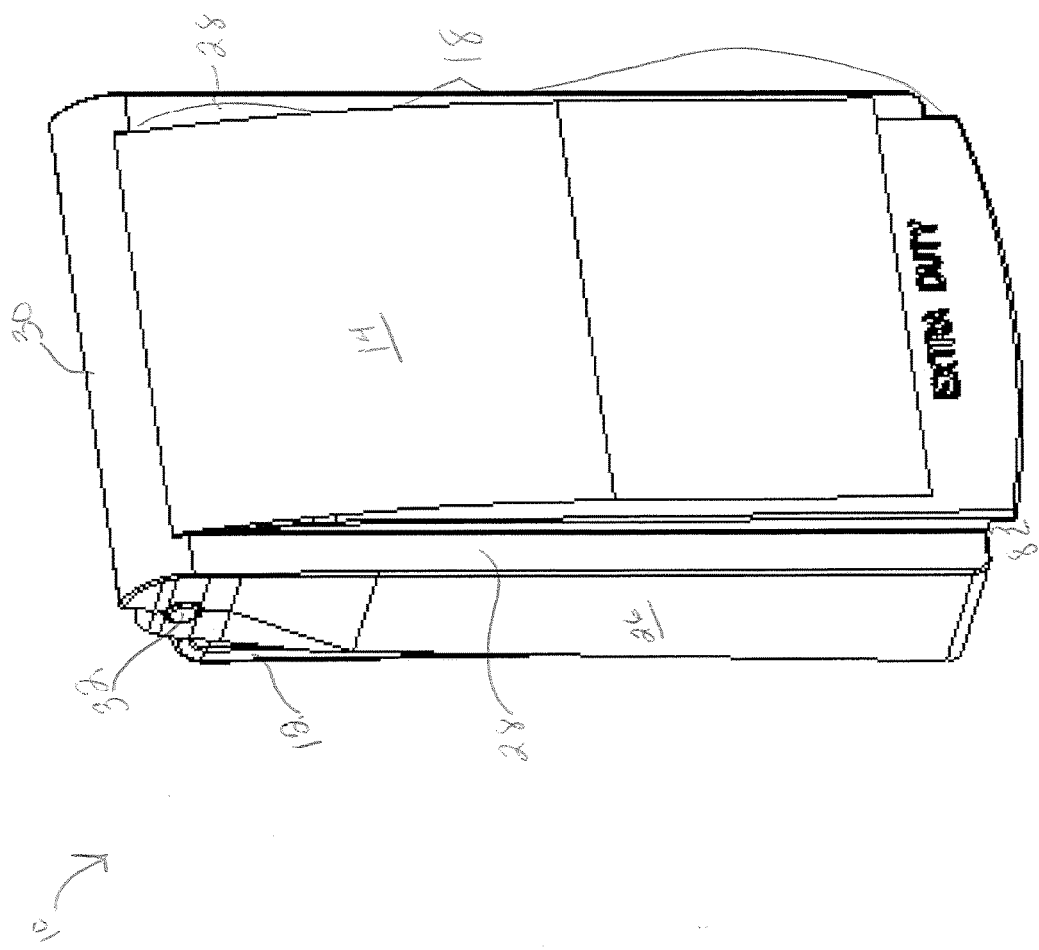
FIG. 1 is an isometric, assembled view of a while in use cover assembly.
Figure 2:
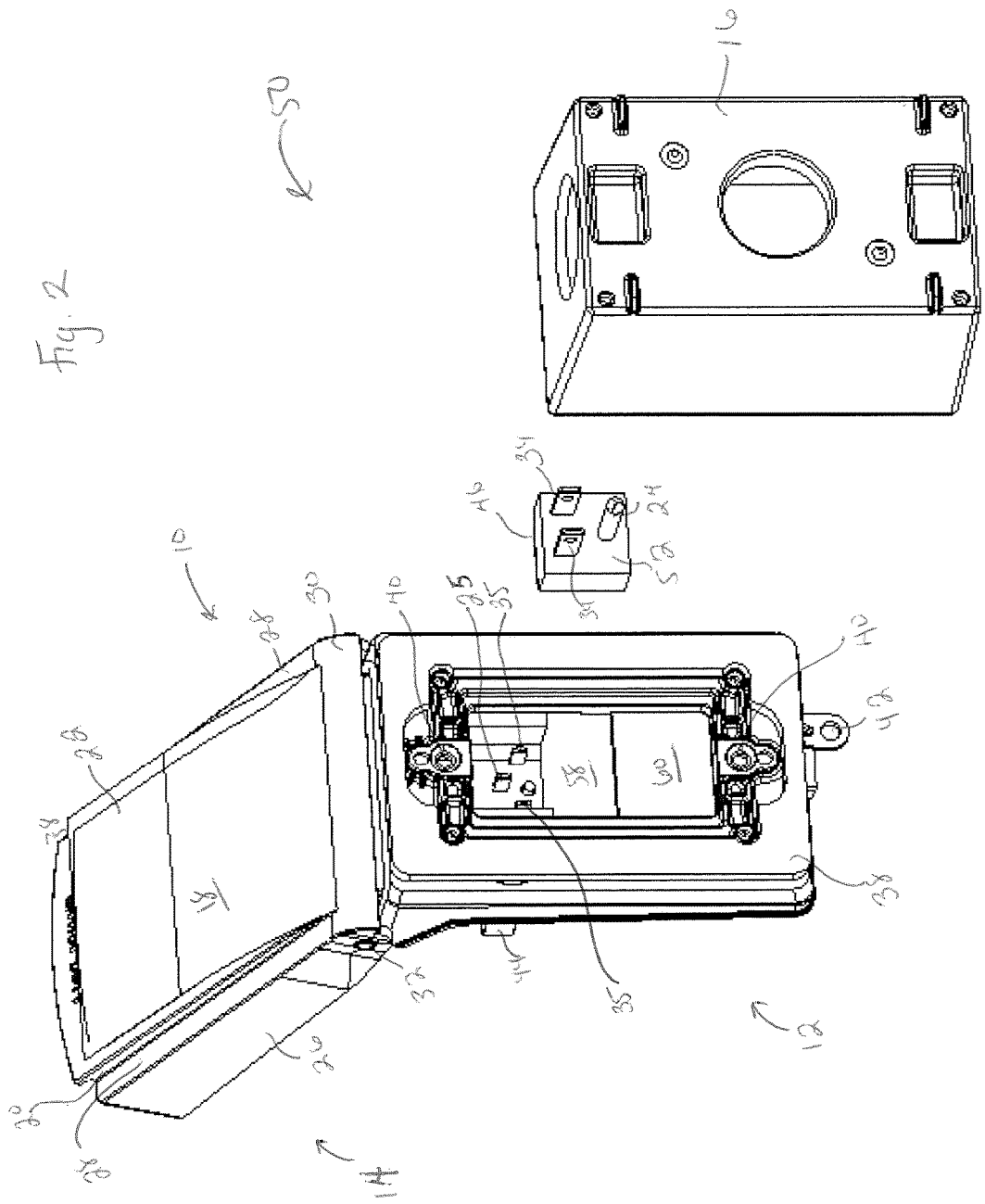
FIG. 2 is an isometric, exploded disassembled rear view of a while in use cover and junction box assembly.
Figure 3:
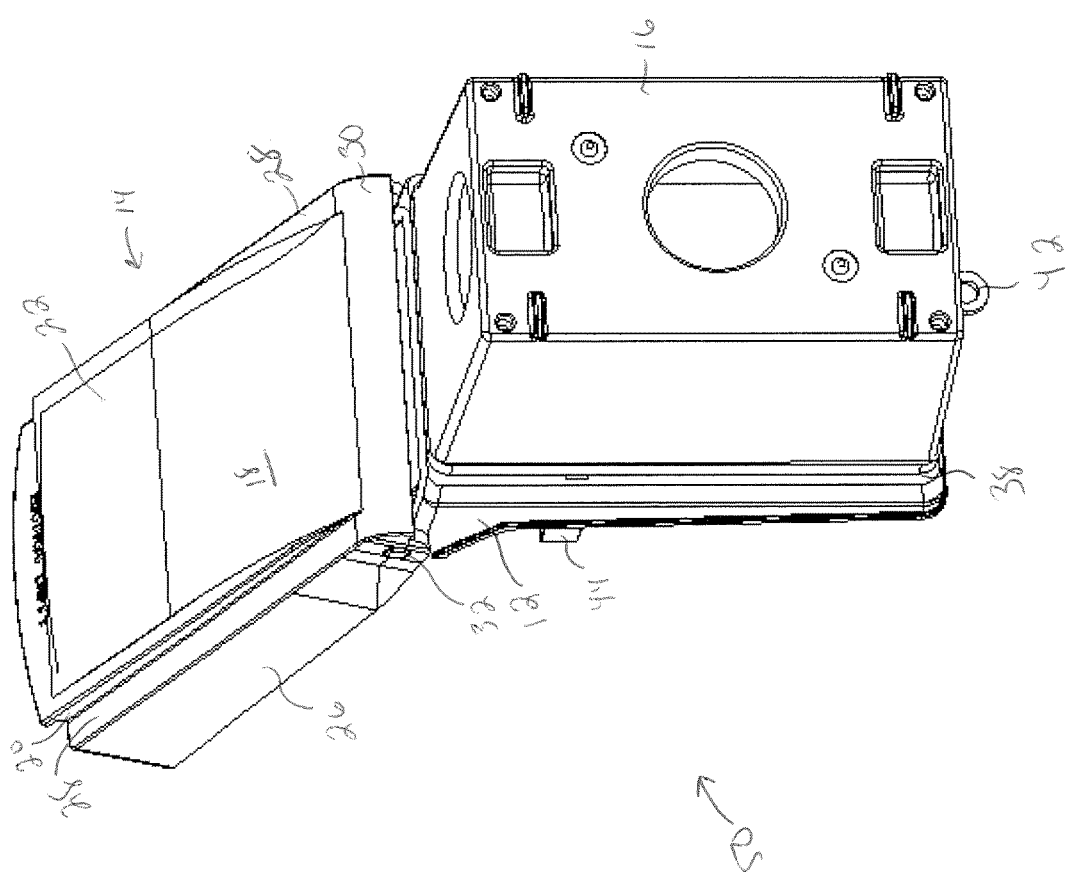
FIG. 3 is an isometric, assembled rear view of the while in use cover and junction box assembly of FIG. 2.
Figure 4:
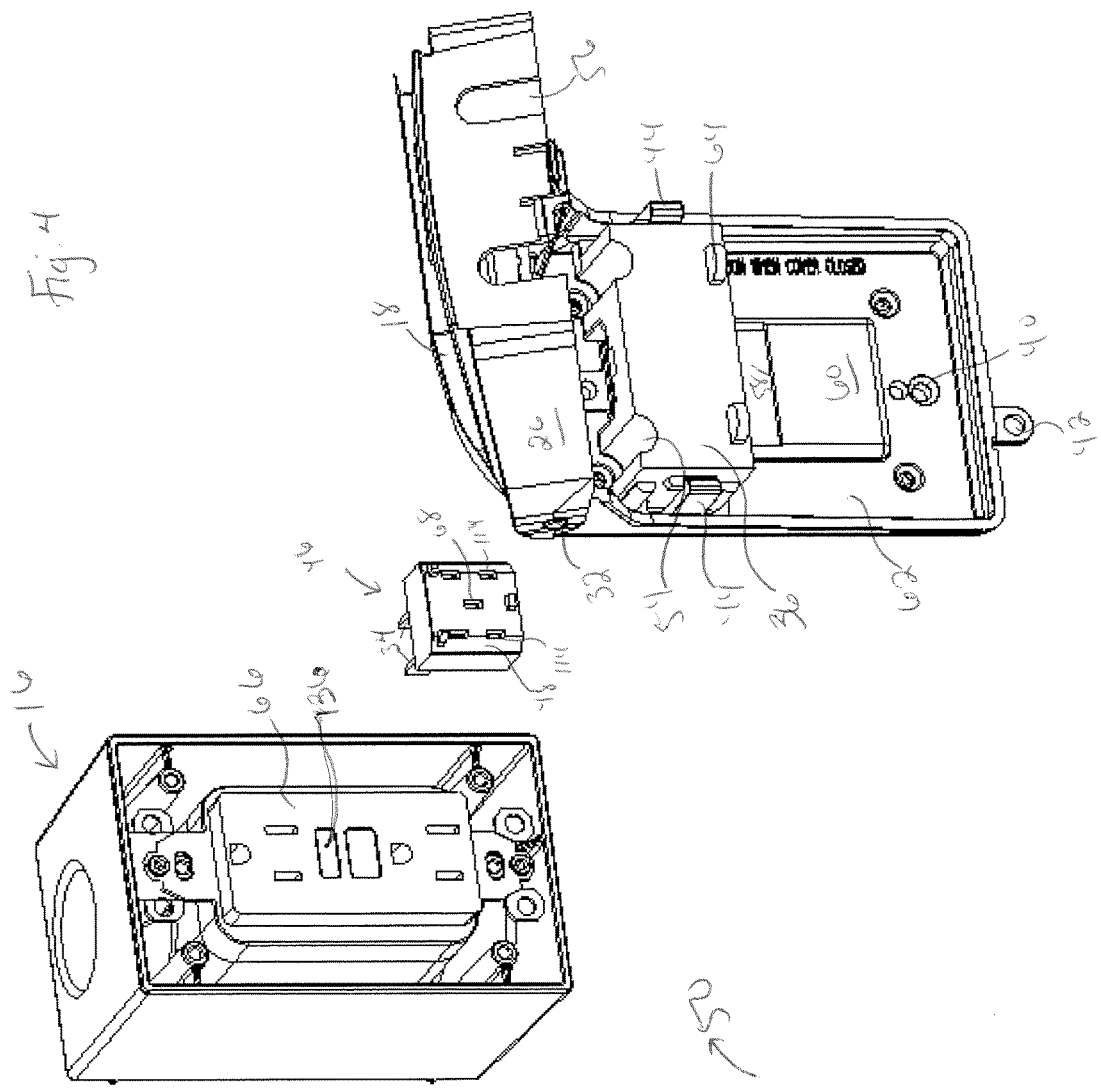
FIG. 4 is an isometric, exploded disassembled front view of the while in use cover and junction box assembly of FIG. 2.

Disclosed herein are while in use cover assemblies that can be attached to an electrical box that is itself attached to a structure (e.g., to an exterior structure). The while in use cover assemblies can comprise a base and a lid with a current member and an orientable adaptor that can be attached to the base. The while in use cover assemblies can have a constant depth, i.e., the same depth when the lid is closed, when in use and when not in use. The constant depth of the while in use cover assemblies can allow for an overall lower profile than was previously attainable, e.g., using a bubble lid or an expandable cover. As used herein, "constant depth" means that the depth does not change if the assembly is in use (with a power cord extending out from the assembly) or not in use, the depth stays the same. The while in use cover assemblies disclosed herein can solve the problem of bulky, unsightly while in use covers, while still providing protection from the elements.

The while in use cover assembly can further comprise an orientable adapter connected to a current member, where the current member can be optionally attached to the lid, and/or optionally attached to the base, and/or a separate component from the base and the lid. As mentioned, the configurations disclosed herein for the while in use cover assembly can allow for a lower profile while in use cover assembly than was previously attainable, e.g., with a bubble lid or with an expandable cover. For example, bubble lids generally have a depth of greater than or equal to 3.5 inches (9 centimeters (cm)). The while in use cover assemblies disclosed herein, however, can be flat, e.g., the while in use cover assemblies can have a constant overall depth that is less than or equal to 2.0 inches (5.08 cm), specifically, less than or equal to 1.9 inches (4.83 cm), even when in use (e.g., when a power cable plug is attached to the current member). The orientable adapter can be inserted into an outlet socket so that when the lid is in an open position, the current member is at a non-parallel angle to the base (e.g., perpendicular to the base) and a power cable plug can be inserted into the current member with ease. Once the power cable plug has been inserted, the lid can be closed (e.g., the lid can be a self-closing lid, i.e., the weight of the lid can pull the lid down and essentially force the while in use cover assembly into a closed position). The various components of the base (e.g., walls and cord opening) are generally substantially parallel to the structure to which it is attached. For example, the components of the base can be angled forward slightly to facilitate insertion of the plug. In other words, if something is substantially parallel to the base, it is also substantially parallel to the structure to which the base is attached.

In some embodiments, when the lid is closed, the current member and cord can be parallel to the base. In embodiments where the current member is attached to the base, the orientation of the current member does not change when the lid is either in the open position or in the closed position. In an embodiment, the current member and the orientable adapter can be separate components from the base and the lid (e.g., the current member and the orientable adapter can be removably attached to the while in use cover assembly). Such a configuration has the advantage of allowing replacement of just the current member and/or the orientable adaptor if needed instead of replacing the entire while in use cover assembly.

The lid can, optionally, comprise an angled or tapered edge (e.g., a lip) to facilitate the removal of water or other debris coming into contact with and/or entering the while in use cover assembly and possibly damaging the components located therein. The lid and the base can be attached to one another via an attachment mechanism, which can be, for example, a hinge or a snap fit connection. If a hinge is used, the hinge can comprise a pin and an opening configured to receive the pin. The pin can be located on the lid or the base and the opening can be located on the base or the lid. The attachment mechanism can comprise a single hinge or multiple hinges, and if multiple hinges are used, they can optionally be detachable. The hinge can be located on any surface of the lid and/or the base that will allow the lid and base to connect together. For example, the hinge can be located on a corner of the base or lid, in a center of a top portion of the base or lip (e.g., along a shorter side), on a side portion of the base or lid (e.g., along a longer side), and combinations comprising at least one of the foregoing. In some embodiments, with the hinge in any of the locations described, the base can, optionally, comprise a channel in which the lid can be inserted (e.g., the edge of the base can comprise a channel where the outside perimeter of the lid sits in the channel when the while in use cover assembly is closed). Here, a gasket can, optionally, be used to create a seal between the lid and the base so that the entry of contaminants into the while in use cover assembly can be prevented. The lid and/or base of the while in use cover assembly can contain an exit for the power cord plug along any point on the bottom edge of the lid and base (e.g., on the left hand side, and/or the right hand side, and/or the middle).

The orientable adaptor can be oriented within the base with the ground terminal of the orientable adaptor at a first position or at a second position, e.g., an upper position or at a lower position; e.g., at a top position or at a bottom position, respective to the orientation of the ground terminal. The current member orientation can remain constant while the orientation of the orientable adaptor changes to accommodate the location of the grounding terminal. In an example, the orientable adaptor can be disposed 90 degrees from the position of the ground terminal, for example, 180 degrees, for example, 270 degrees.

Optionally, the lid can be attached to one of the longest sides of the base if the while in use cover assembly will be oriented horizontally, and attached to one of the shorter sides of the base if the while in use cover assembly will be oriented vertically. Optionally, hinges can be located on a shorter side and other hinges on a longer side of the base and lid so that either orientation of the while in use cover assembly can be used.

Referring now to the figures, which are exemplary and not intended to limit the scope hereof. A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 11:
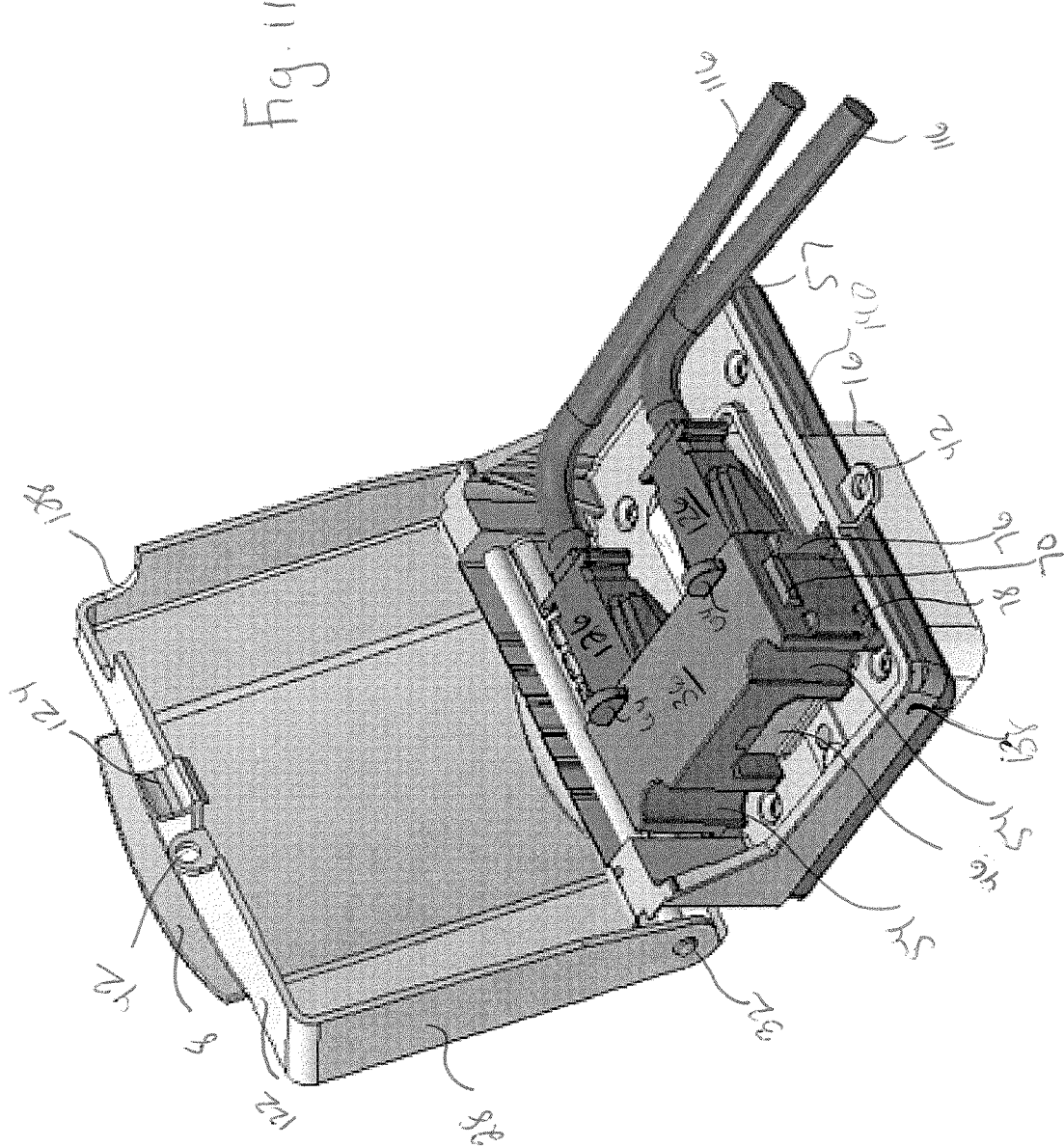
FIG. 11 is an isometric, perspective view of the while in use cover and junction box assembly of FIG. 9.
Figure 12:
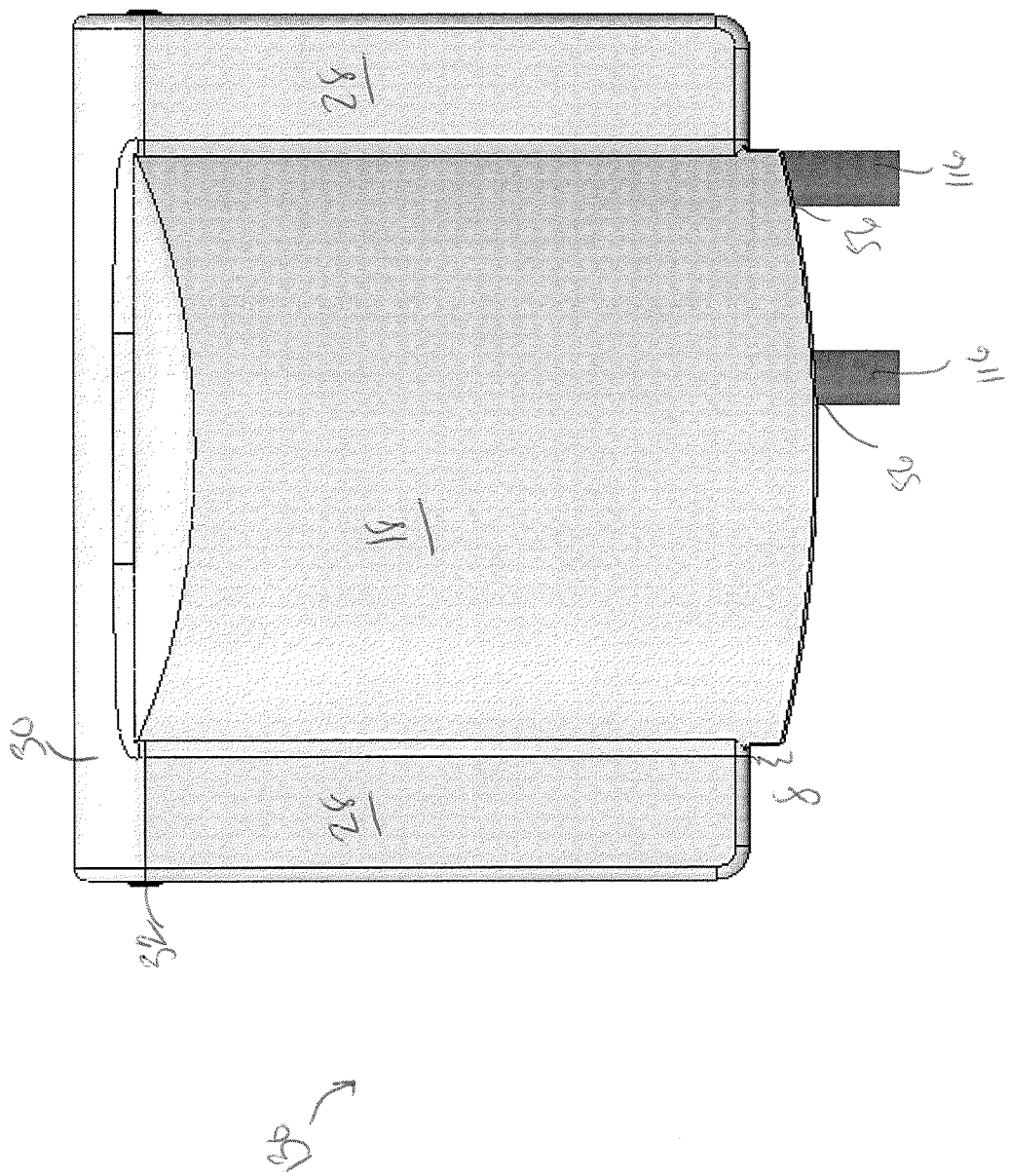
FIG. 12 is a front view of a lid of a while in use cover assembly with an in line power cord exit.
Figure 13:
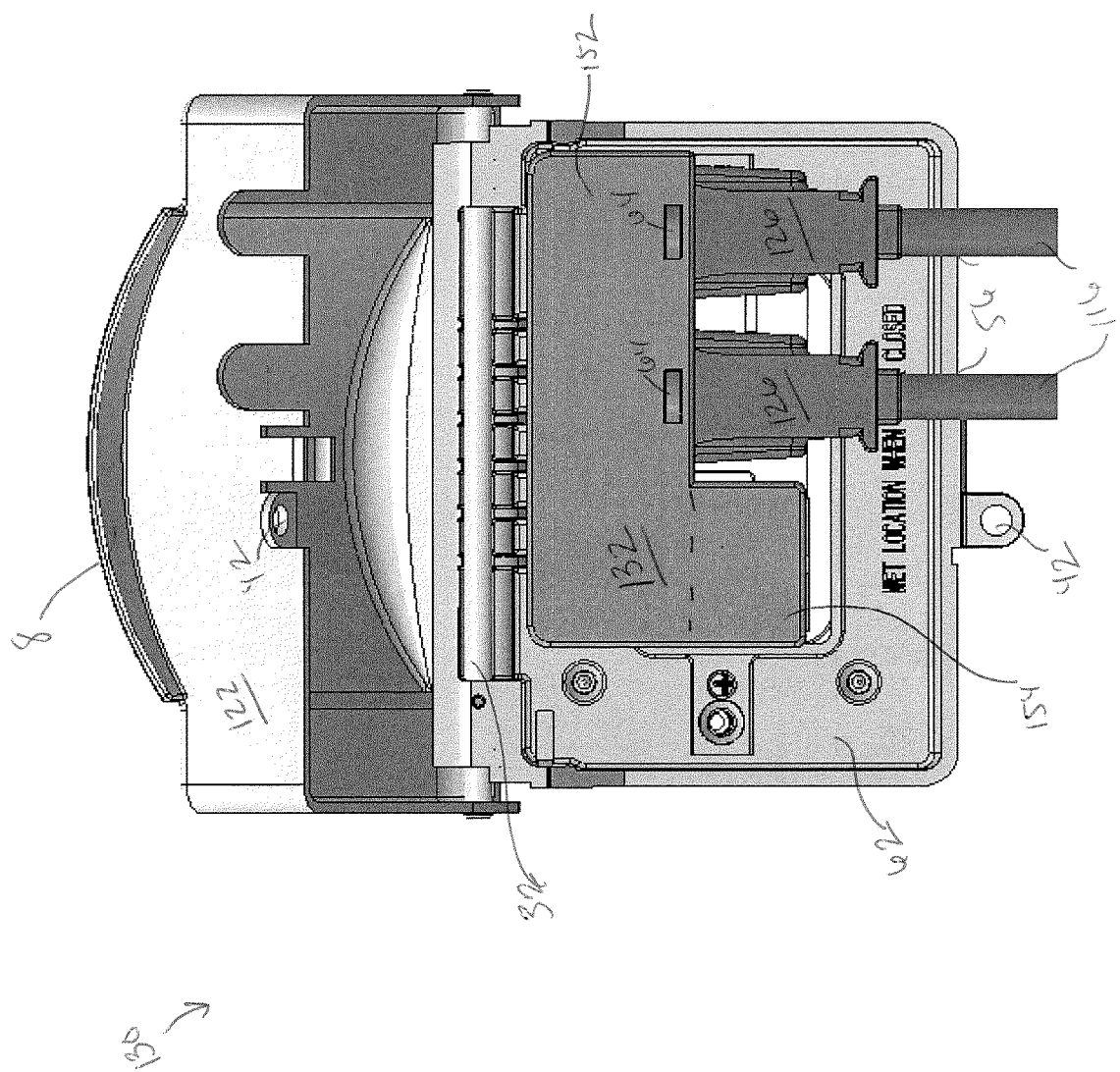
FIG. 13 is a front view of a base and interior components of the while in use cover assembly of FIG. 12.
Figure 26:
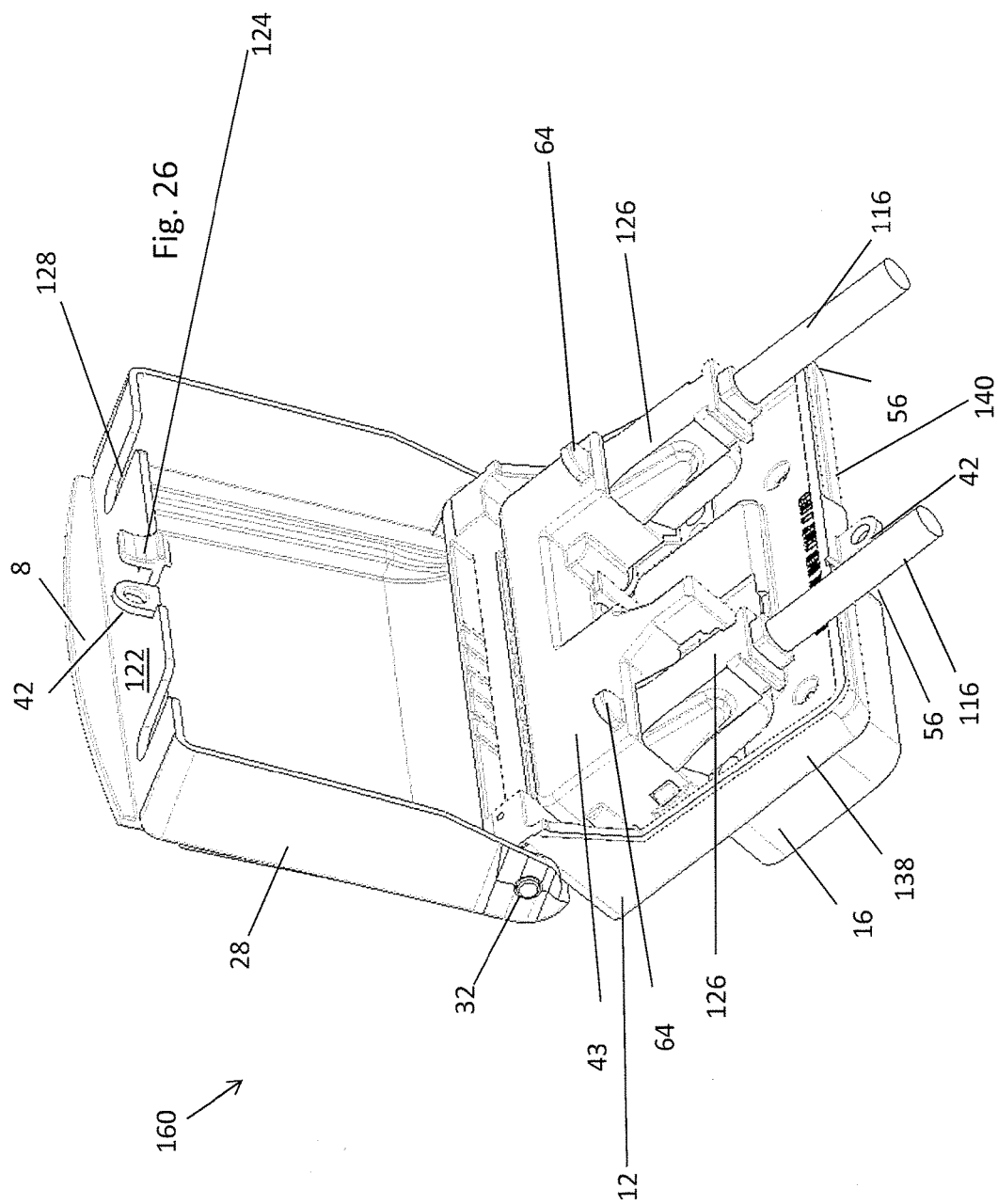
FIG. 26 is an isometric, perspective view of the while in use cover and junction box assembly of FIG. 24.
Figure 27:
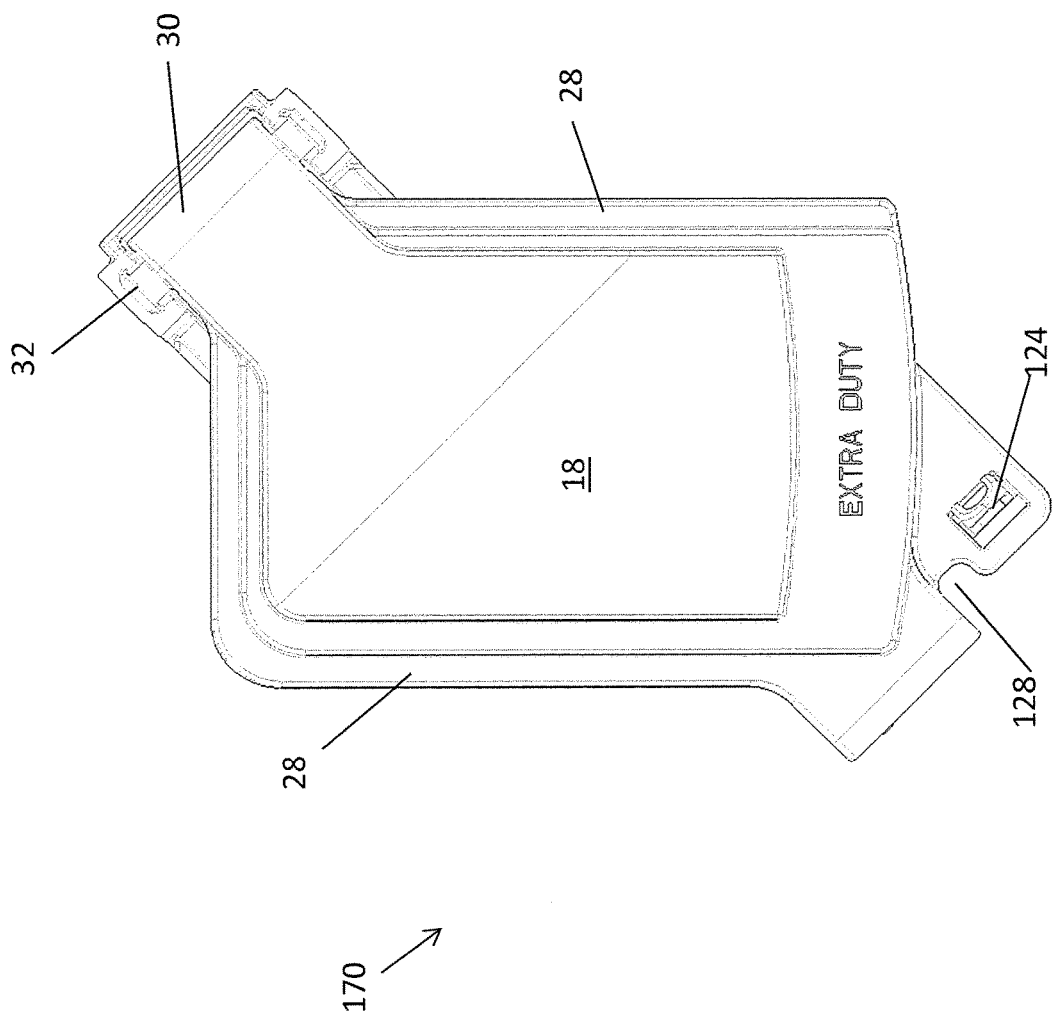
FIG. 27 is another front view of a lid of a while in use cover assembly with a corner power cord exit.
Figure 28:
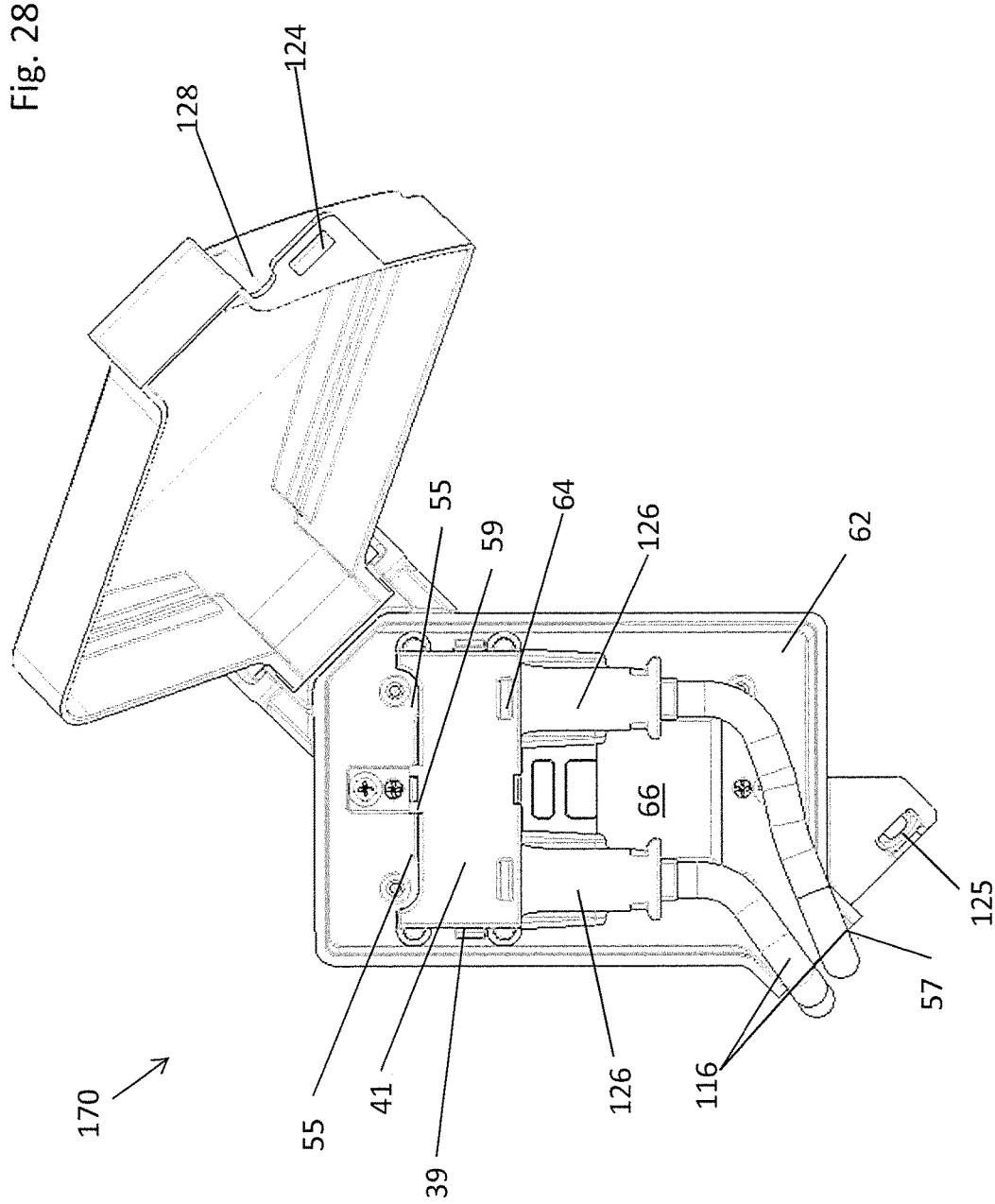
FIG. 28 is a front view of a base and interior components of the while in use cover assembly of FIG. 27.
Figure 29:
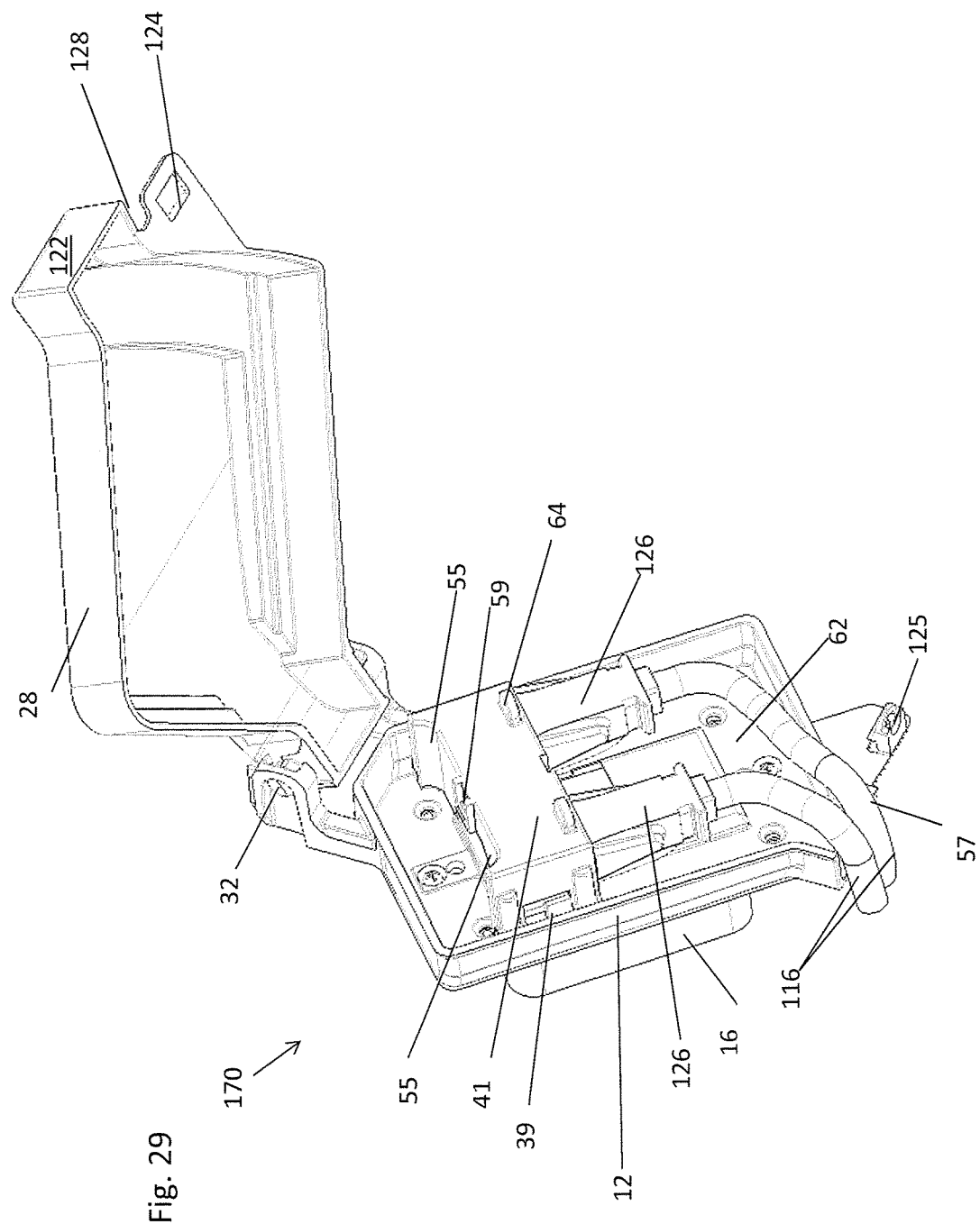
FIG. 29 is an isometric, perspective view of the while in use cover and junction box assembly of FIG. 27.

FIGS. 1-6, 9-14, 15-19, and 22-29 illustrate various views of embodiments of the while in use cover assembly 10. FIGS. 1-6, 9-14, 15-19, and 22-29 illustrate assembled and exploded views of the while in use cover assembly 10. FIGS. 2-5, 11, 14, 15-18, 23, 26, and 29 illustrate that the while in use cover assembly 10 can comprise a base 12 and lid 14 attached to a junction box 16, thus forming a while in use cover and junction box assembly 50, 51, 120, 121, 130, 160, 170 (FIGS. 1, 3, 5, 9-14, 15-19, and 22-29). FIGS. 30-34 illustrate various views of a while in use cover assembly 220 and its various components. FIG. 33 illustrates that a while in use cover assembly 220 can comprise a base 12 and lid 14 attached to a junction box 16, thus forming a while in use cover and junction box assembly 250. As illustrated in FIG. 11 and FIG. 26, the base 12 can comprise a first side 138 and a second side 140 wherein the lengths of the sides can be the same or different. Optionally, a gasket 38 can be located on a side of the base facing the junction box 16 to assist in sealing the base 12 to the junction box 16 (see e.g., FIG. 11). A power cord exit 128 can be located on the lid 14, for example on any location along a lid extension 26, side lid lip 28, top lid lip 30, and/or lid bottom 122 (see e.g., FIGS. 11, 14, 26, and 29). As is illustrated, the power cord exit(s) 128 can be located at a corner of the base and lid to facilitate use of the assembly in the vertical or horizontal orientations (see e.g., FIGS. 9-14, 22, 23, and 27-29). In other words, the power cord exit 128 can comprise a power cord exit 57 that is diagonal to the current member 36. Optionally, power cord exit(s) 128 can be located through a wall of the lid (14), instead of a corner. In such an embodiment, the cord can extend straight from the current member 132, out of the cover assembly 10 as illustrated in FIGS. 12-14 and FIGS. 24-26. In other words, the power cord exit 128 can comprise a power cord exit 56 that is in line with the current member 132. The power cord exit can have a width that is configured to receive a power cord plug 116. In other words, the power cord exit 128 can hold the power cord plug 116 in place.

The lid 14 can also, optionally comprise a lid extension 26 around the perimeter of the lid 14 that facilitates drainage of water or other foreign contaminants from seeping into the base 12. The lid extension 26 can be angled or tapered to allow water or other contaminants that can come into contact with the while in use cover assembly 10 to run down and off the lid 14 rather than entering the while in use cover assembly 10 and potentially short circuiting or otherwise damaging the junction box 16. The lid 14 can further comprise a lid attachment portion 124 located on the lid bottom 122. The lid attachment portion 124 can be used for opening and closing of the lid 14. Although the lid attachment portion 124 is illustrated on the lid bottom 122, it is to be understood that the lid attachment portion 124 can be on any location of the lid 14. The lid attachment portion 124 can engage the base 12, thereby enabling, for example, a snap closure that can facilitate retention of the lid in the closed position. The lid 14 can also further comprise lid overhang 8, lid bump-out 18, lid bump-out sidewall 20, and lid bump-out main wall 22 as depicted, for example, in FIG. 2.

Figure 5:
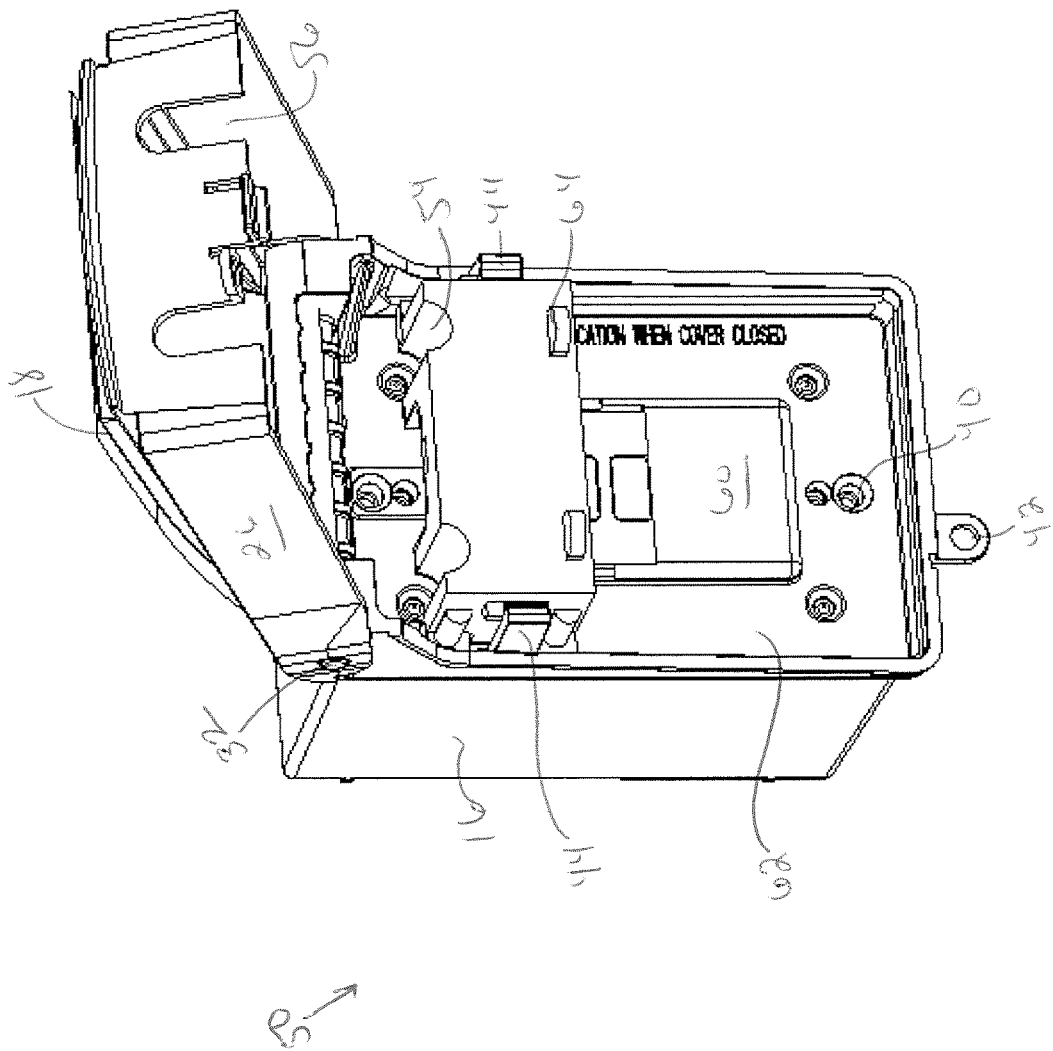
FIG. 5 is an isometric, assembled front view of the while in use cover and junction box assembly of FIG. 2.
Figure 6:
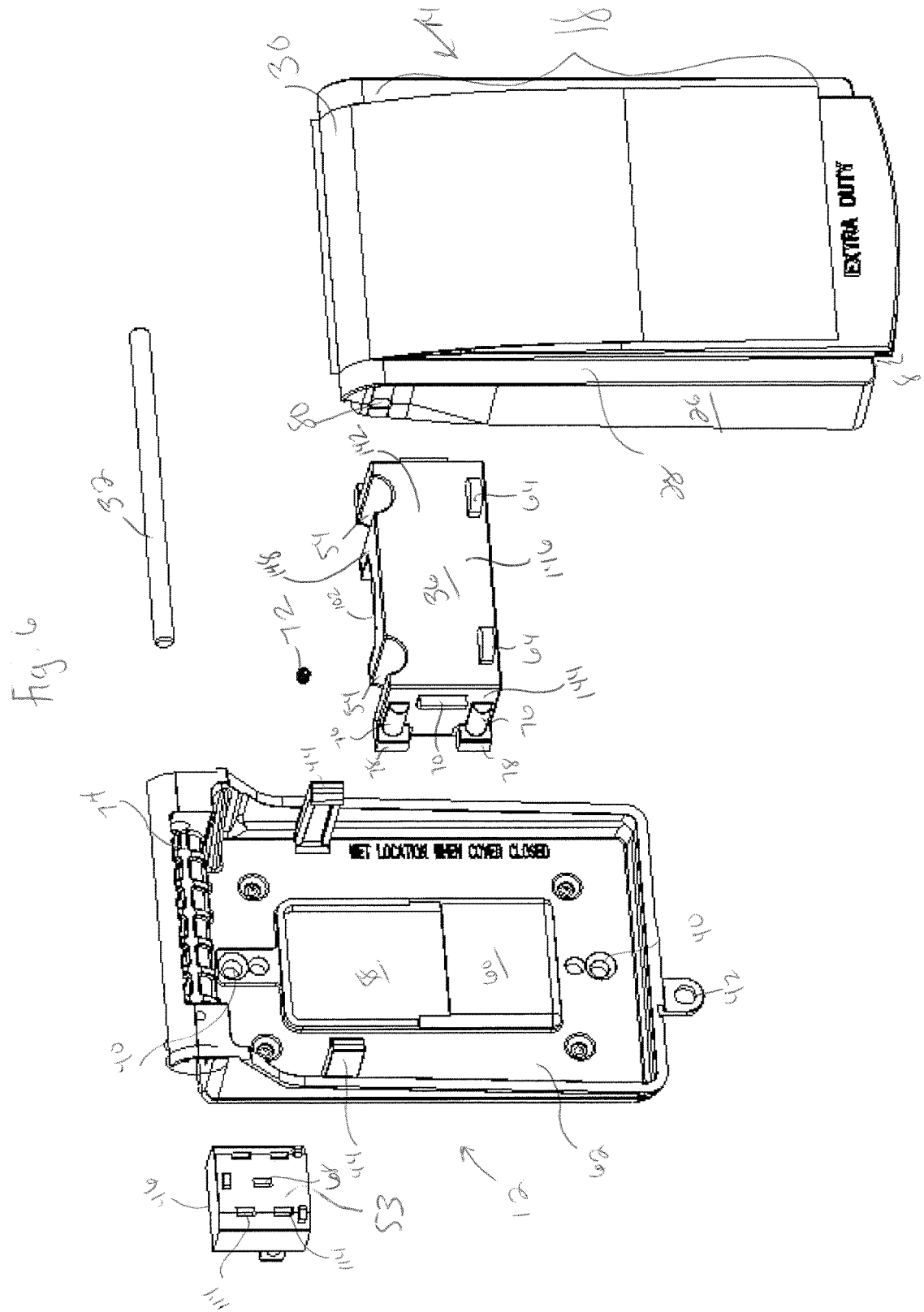
FIG. 6 is an exploded, disassembled view of the while in use cover assembly of FIG. 1.
Figure 19:
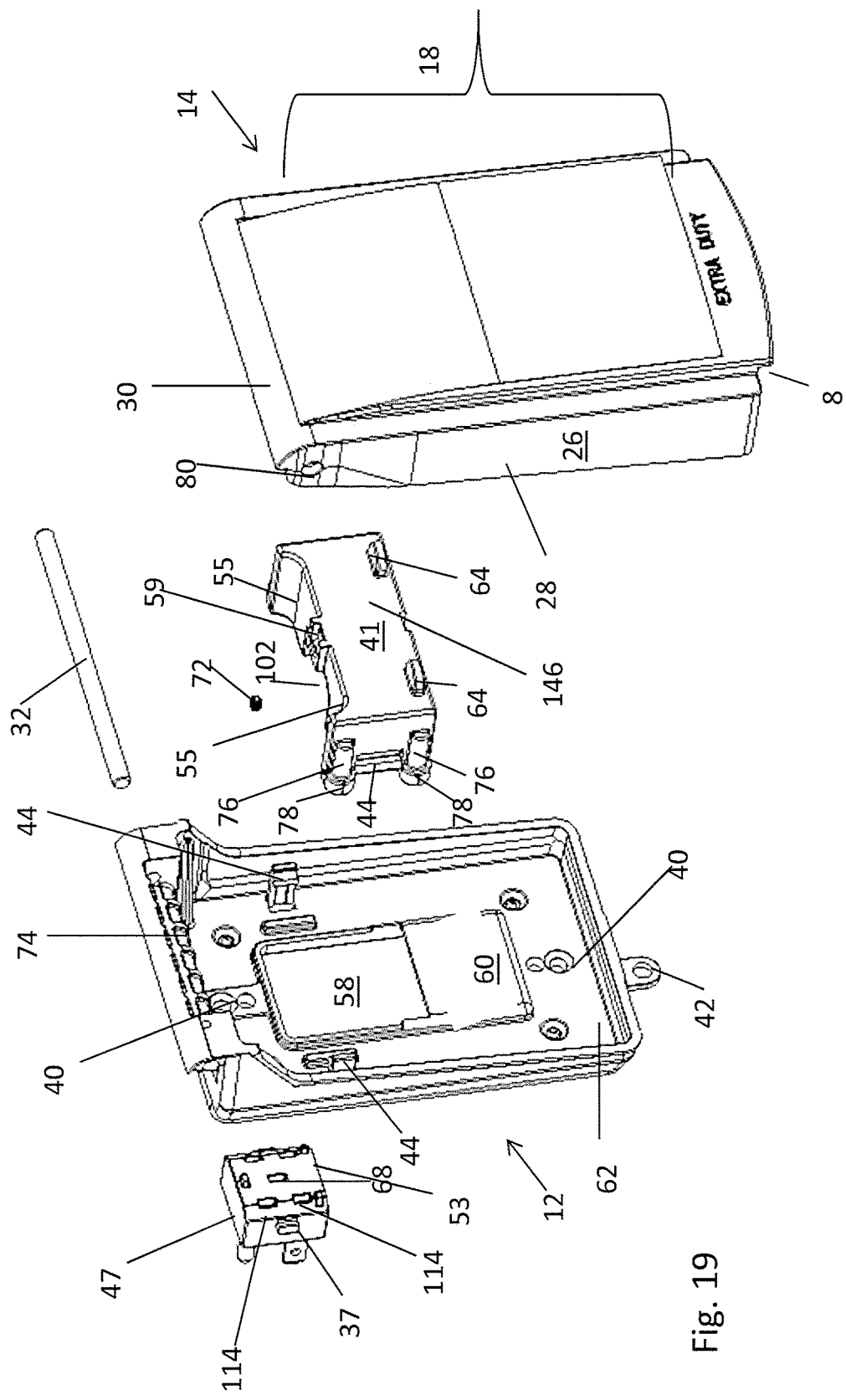
FIG. 19 is an exploded, disassembled view of the while in use cover assembly of FIG. 1.

As can be seen in FIGS. 1-6, 9-13, 15-19, 22, 23, and 30, the lid 14 can additionally comprise a top lid lip 30 comprising an opening 80 that can be configured to engage with a pin 32 of a base attachment portion 74. It is to be understood, however, that the attachment portions are not limited and the base attachment portion can contain the opening 80 and the top lid lip 30 can contain a pin 32. The pin 32 and opening 80 can form a hinge member 72 as illustrated in FIG. 6 and FIG. 19. The hinge member 72 is not present in FIG. 30. The hinge member 72 can be located on any side of the base 12 and/or the lid 14 that will allow the base 12 and lid 14 to connect together. For example, the hinge member 72 can comprise a pin 32 and an opening 80 attached on a corner of the base and lid (e.g., a corner hinge) or can be located at any point along any of the walls of the base 12 or lid 14. Optionally, the assembly can have more than 4 sides, e.g., to accommodate a corner hinge. It is to be understood, however, that other hinge configurations are possible (e.g., multiple pins and openings). It is contemplated that the pin 32 and opening 80 can be attached on a first wall, a second wall, and/or a side wall of the base 12 and/or the lid 14 to create the hinge member 72. Therefore, although a vertical design is illustrated, a horizontal design is also contemplated.

The lid 14 can be opaque (e.g., cannot be seen through by a user), and/or can be transparent (e.g., can be seen through by a user), and/or can be partially opaque and/or partially transparent. For example, a top half of the lid 14 can be opaque so that a user cannot see the current member 36, 41, 43, 45, 132 when the lid 14 is closed and a bottom half of the lid 14 can be transparent, or the lid can have a transparent portion (e.g., a window). The window, for example, could enable a user to see the status of the outlet (e.g., whether functioning properly or if the outlet has been tripped and needs to be reset). For example, some outlets (e.g., ground fault circuit interrupters (GFCI)) have an indicator light that is green when the outlet is functioning properly and that is red when the outlet is not functioning properly and requires attention. Being able to see the status of the outlet through a transparent portion would be advantageous in that the lid 14 would not need to be opened in order to determine that there is a problem. As used herein, "transparent" refers to sufficient optical clarity such that a user can see the desired portion of the outlet through the lid.

The while in use cover assembly 10 can comprise an orientable adapter 46, 47, a power cord plug 116, and current member 36, 132. The while in use cover assembly 220 can comprise an orientable adapter 49 and current member 45. Optionally, the current member 36, 41, 43, 45, 132 can be removably coupled to the base 12 such that the orientable adapter 46, 47, 49, power cord plug 116, and/or current member 36, 41, 43, 45, 132 can be removed and replaced without having to replace the entire while in use cover assembly 10, 220. In other words, removal of the orientable adapter 46, 47, 49, power cord plug 116, and/or current member 36, 41, 43, 45, 132 would not damage the base 12 or lid 14. For example, the current member 36, 132 can be attached to the base 12 via a snap fit connection between the adjustable tab 70 and removable tab 44 attached to an inside surface of the base 12 (see e.g., FIG. 6). Other techniques of coupling the base 12 and current member 36, 132 are contemplated, such as an adhesive or bonding element dispersed between the adjustable tab 70 and removable tab 44, which can, optionally, have a shape to match with a top of the current member 36, 132 (e.g., a square shape); as well as a pressure fit or any other techniques of attaching the base 12 and current member 36, 132. For example, as shown in FIGS. 15-19 and 22-25, the current member 41 can be removably coupled to the base 12 via a snap fit connection between the adjustable tab 37 on the orientable adaptor 47 and a removable tab 39 located on the current member 41. In another embodiment, the current member 36, 41, 43, 132 can be integral with the base 12 (i.e., not removable). In such an embodiment, the current member 36, 41, 43, 132 is molded, bonded, or otherwise irremovably secured to the base 12. Integral and irremovably are intended to mean that removal of the current member 36, 41, 43, 132 from the base 12 would damage the base 12 and/or the current member 36, 41, 43, 132.

In another embodiment, as shown in FIGS. 30-34, the current member 45 can be attached to the base 12 via a snap fit, removable connection between the adjustable lugs 79 and removable tab 44 attached to an inside surface of the base 12. Other techniques of coupling the base 12 and current member 45 are contemplated, such as an adhesive or bonding element dispersed between the adjustable lug 79 and removable tab 44, which can, optionally, have a shape to match with a top of the current member 45 (e.g., a square shape); as well as a pressure fit or any other techniques of attaching the base 12 and current member 45. For example, as shown in FIGS. 30-34, the current member 45 can be removably coupled to the base 12 via a snap fit connection between the adjustable tab 37 on the orientable adaptor 49 and a removable tab 39 located on the current member 45.

In another embodiment, the current member 45 can be integral with the base 12 (i.e., not removable). In such an embodiment, the current member 45 is molded, bonded, or otherwise irremovably secured to the base 12. Integral and irremovably are intended to mean that removal of the current member 45 from the base 12 would damage the base 12 and/or the current member 45.

Figure 31:
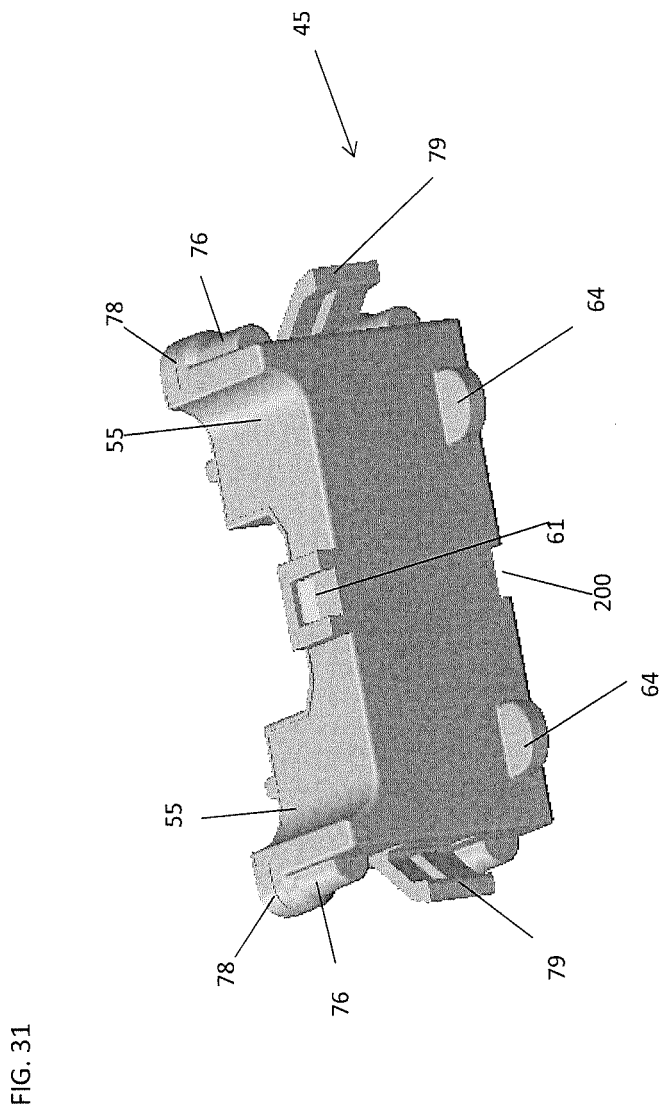
FIG. 31 is an isometric, perspective view of a current member of the while in use cover assembly of FIG. 30.
Figure 32:
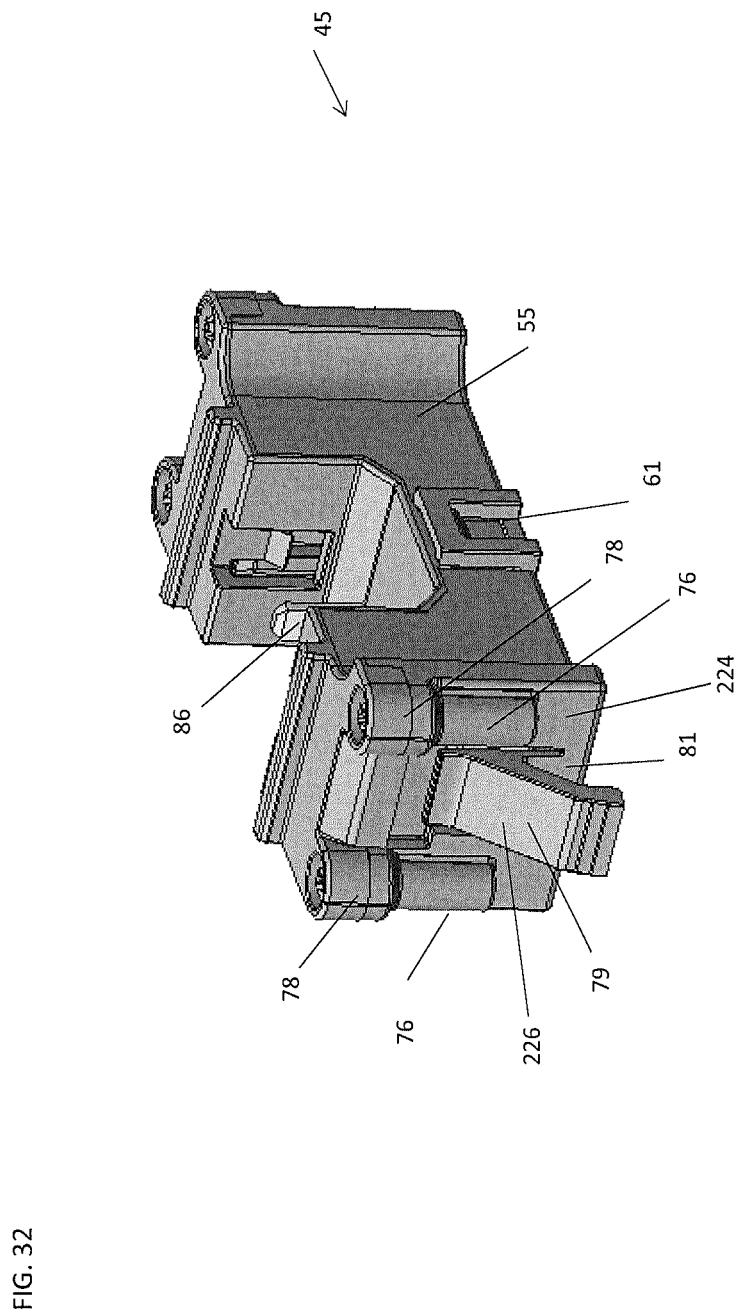
FIG. 32 is another isometric, perspective view of a current member of the while in use cover assembly of FIG. 30.
Figure 33:
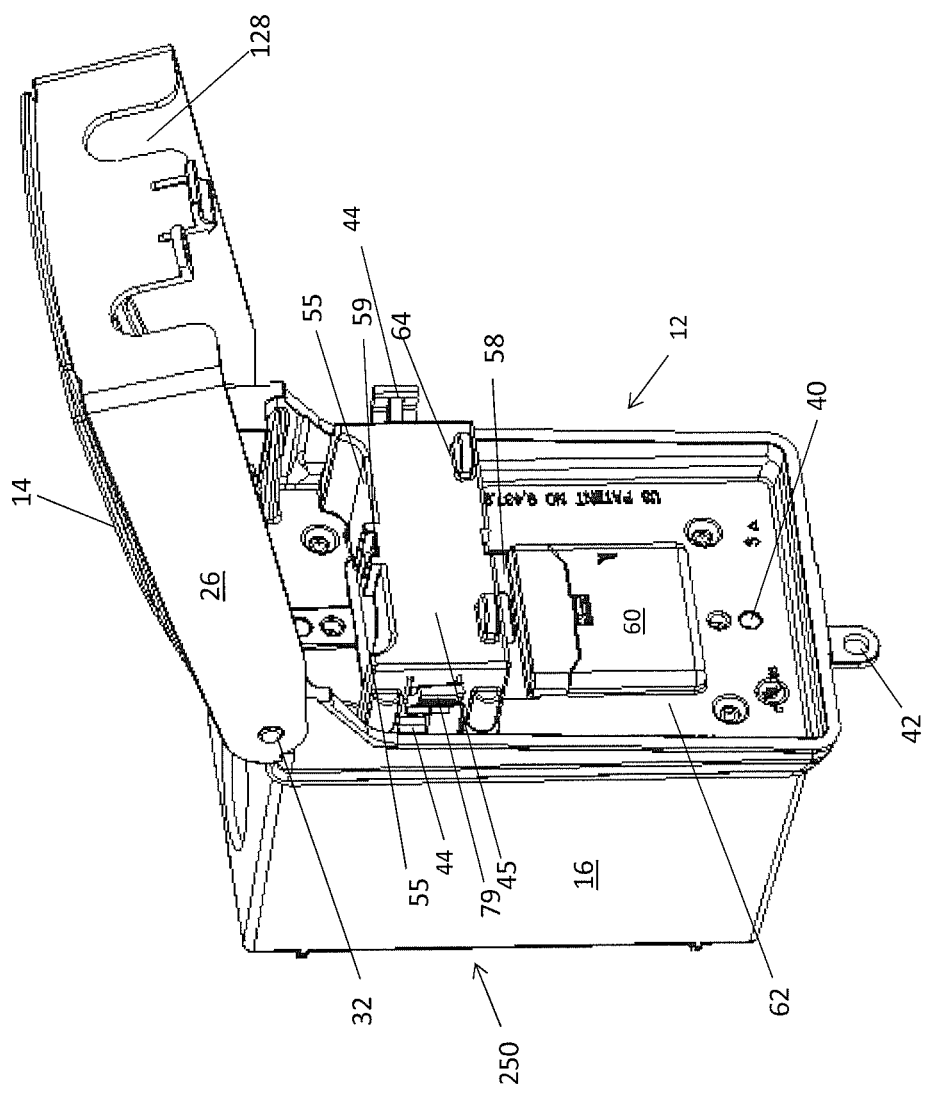
FIG. 33 is an isometric, assembled front view of the while in use cover assembly of FIG. 30 attached to a junction box.

The adjustable lugs 79 on the current member 45 are shown in more detail in FIGS. 31 and 32. The adjustable lugs 70 can extend from either side 224 of the current member 45 at an angle with an opening 81 between an outside surface 226 of the adjustable lug and the side 224 of the current member 45. The adjustable lugs 79 can be flexible such that the current member 45 can be snap fit attached to the base 12 by pushing the current member 45 into the base. The adjustable lugs 79 can be flexible such that the current member 45 be released from the base 12 by pressing the adjustable lugs 79 toward the sides 224 of the current member 45 to close the opening 81.

As is illustrated in FIGS. 4, 6, 7, 10, 11, 13, and 14, current member 36, 132 can comprise current member power elements 150 located in the orientable adaptor receiving portion 154, wherein the current member power elements 150 are in physical (and hence electrical) contact with grounding aperture 68 or blade apertures 114 located in the receiving side 48 of the orientable adaptor 46, e.g., without the use of a cord assembly. As is illustrated, the blade apertures 98 of the current member 36, 132 can be electrically connected to the power cord 116 so that electricity can be directed through the current member 36, 132 and to the power cord 116 during use. Here, the current member 36, 132 is in direct physical contact with the orientable adaptor 46, e.g., instead of a cable from the current member 36, 132 to the adaptor 46. The receiver plugs can be formed integral with the lid, e.g., are not removably attached to the lid, but are permanently attached. The grounding tab 24 and prong 34 located on the adaptor side 52 of the orientable adaptor 46 can be electrically connected to an outlet socket 66 of a junction box 16 via the orientable adaptor 46 and the junction box attachment opening 40 (see FIGS. 2, 4 and 5). The orientable adaptor 46 can be connected to the current member 36 via grounding tab 25 and prong(s) 35 on a member side 53 of orientable adaptor 46.

The design of the while in use cover assembly 10, 220 is such that it is not necessary to bend the power cord plug 116 to about 90 degrees of the male socket 126 in order to close and secure the lid. Bubble covers were designed with sufficient room to enable the power cord plug 116 to extend from a male socket 126 at an angle of about 90 degrees to the power cord exit 128 from the lid 14. In the present while in use cover assembly 10, the power cord plug 116 can extend from a male socket 126 at an angle (with respect to the lid 14 and the back wall 62) that is substantially parallel with the power cord exit 128. In other words, the power cord plug 116 can exit the while in use cover assembly 10 at a cord angle that is between θ−15 degrees and θ+15 degrees. Hence, when the while in use cover assembly 10, 220 is in use, a power cord plug 116 can be attached to the male socket 126, and the power cord plug 116 can extend through the power cord exit 128 while bending toward the back wall 62 or the lid 14 by less than or equal to 15 degrees, e.g., as measured from the angle parallel with an axis A (see FIG. 14).

Figure 7:
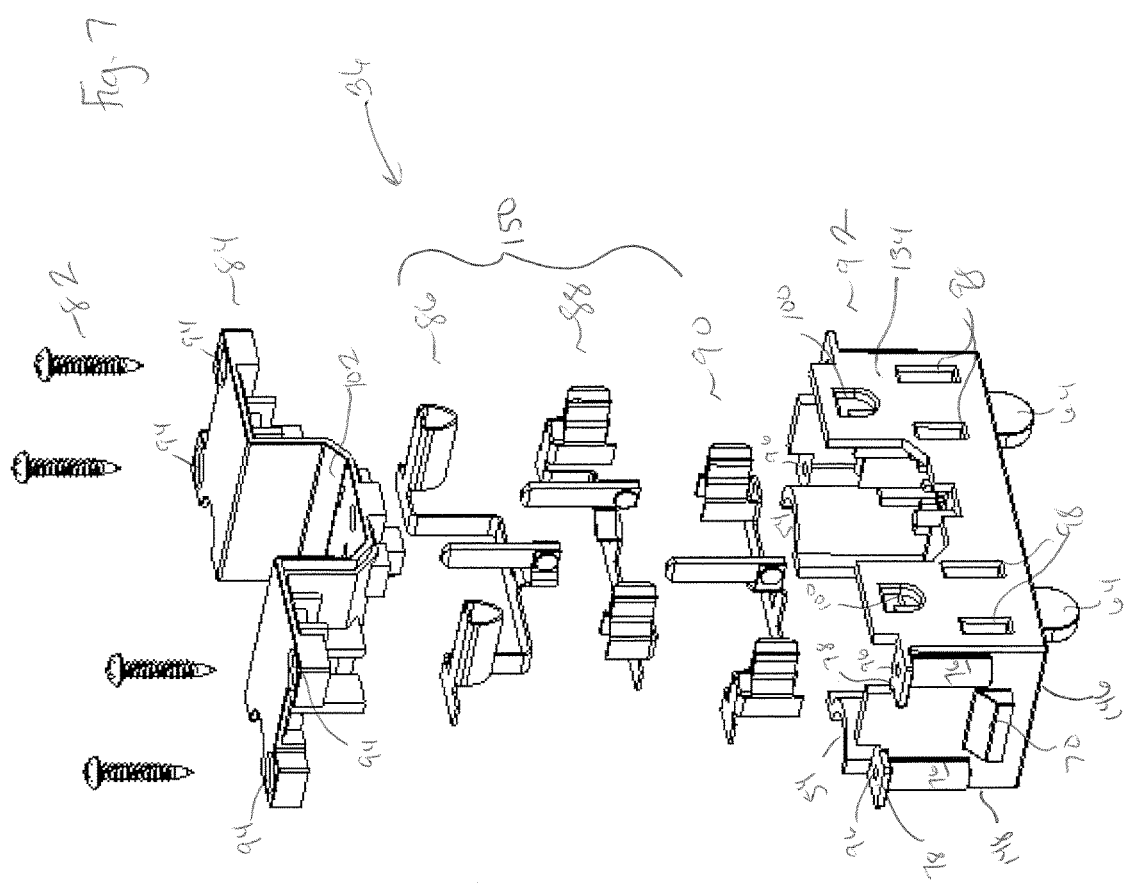
FIG. 7 is an exploded, disassembled view of a current member of a while in use cover assembly.

The number of power cord plugs 116 that can be received by the plug receiving portion 134, 152 of the current member 36, 132 is not limited and generally based upon the electrical rating of the outlet with which it will be used. As can be seen, the plug receiving portion 134, 152 of the while in use cover assembly 10 can receive greater than or equal to one power cord plug(s) 116, specifically, greater than or equal to two power cord plug(s) 116 (see FIGS. 10, 11, 13, 14, and 22-29). The plug receiving portion 134, 153 can, optionally, comprise a ground aperture 54. Current member housing 92 can also, optionally, comprise pedestal(s) 64, adjustable tab(s) 70, boss 76, aperture(s) 96 for screw(s) 82, grounding aperture(s) 100, ledge(s) 78, and indentation(s) 54 as illustrated in FIG. 7. The current member 36, 132 can further comprise cover 84, long side 142, short side 144, center portion 102, front portion 146, top portion 148, opening(s) 94, and current member power elements 150, including grounding terminal 86, phase terminal 88, and neutral terminal 90.

Figure 20:
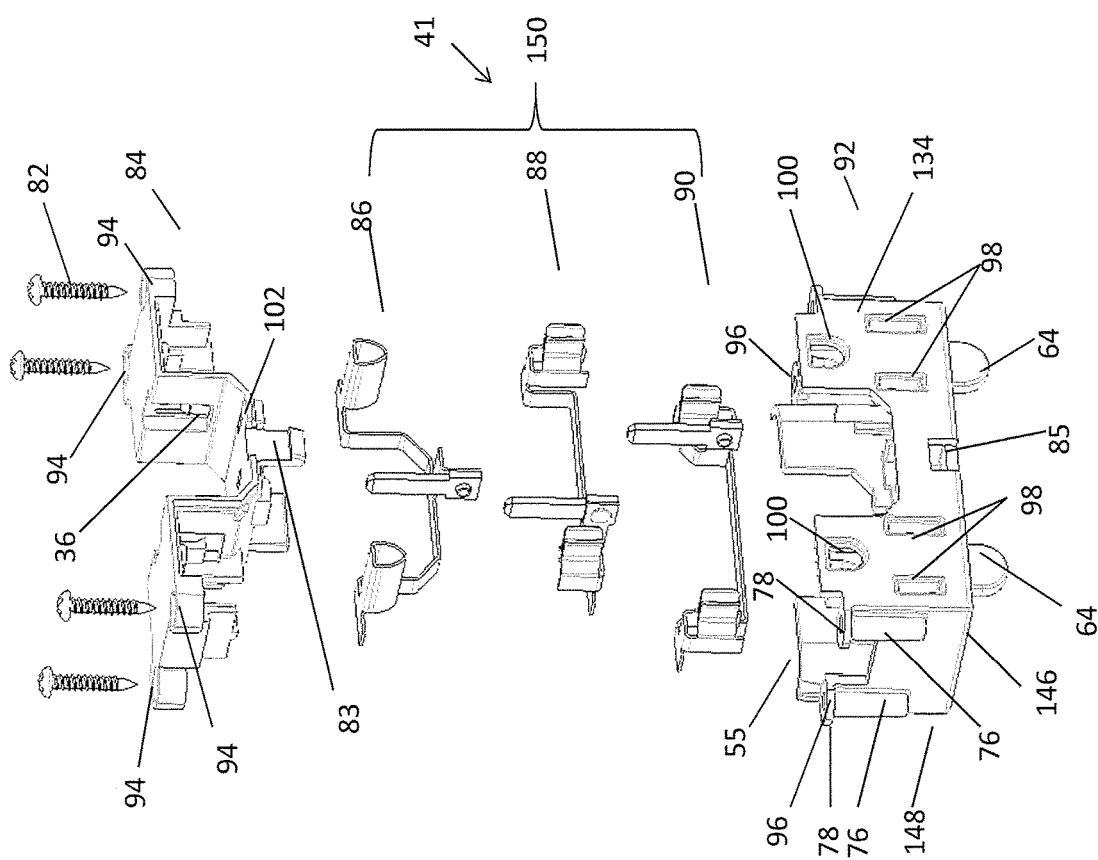
FIG. 20 is an exploded, disassembled view of a current member of a while in use cover assembly.
Figure 21:
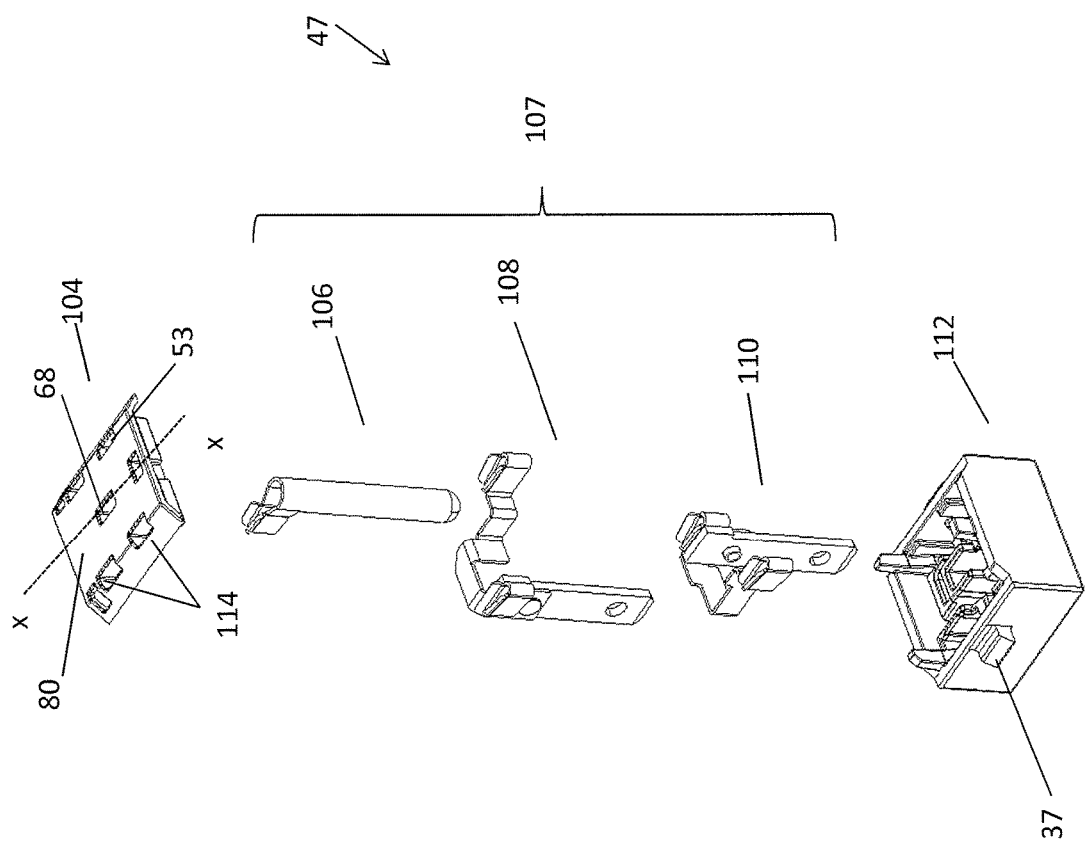
FIG. 21 is an exploded, disassembled view of an orientable adaptor of a while in use cover assembly.
Figure 22:
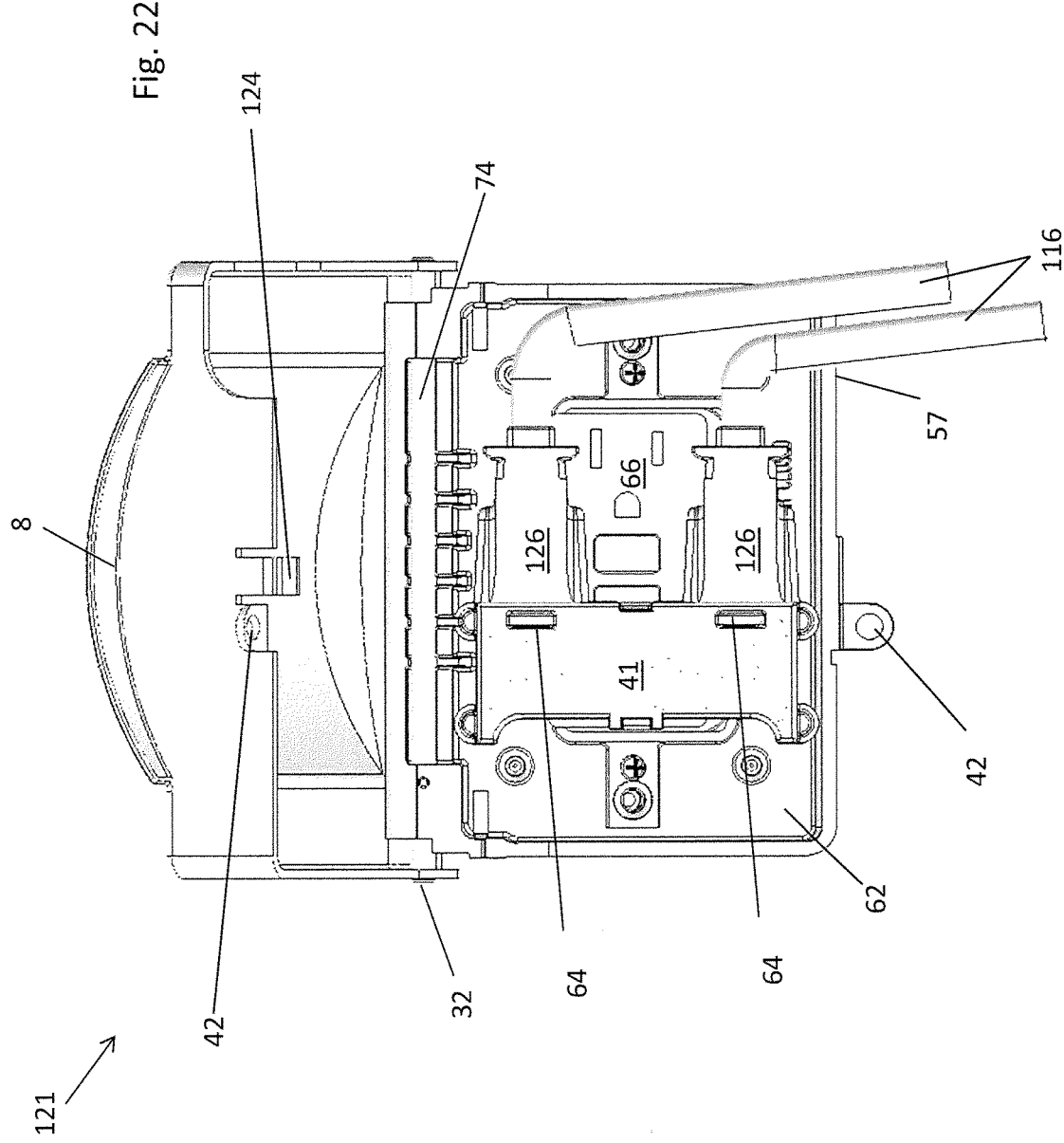
FIG. 22 is a front view of a base and interior components of a while in use cover assembly with a corner power cord exit.
Figure 23:
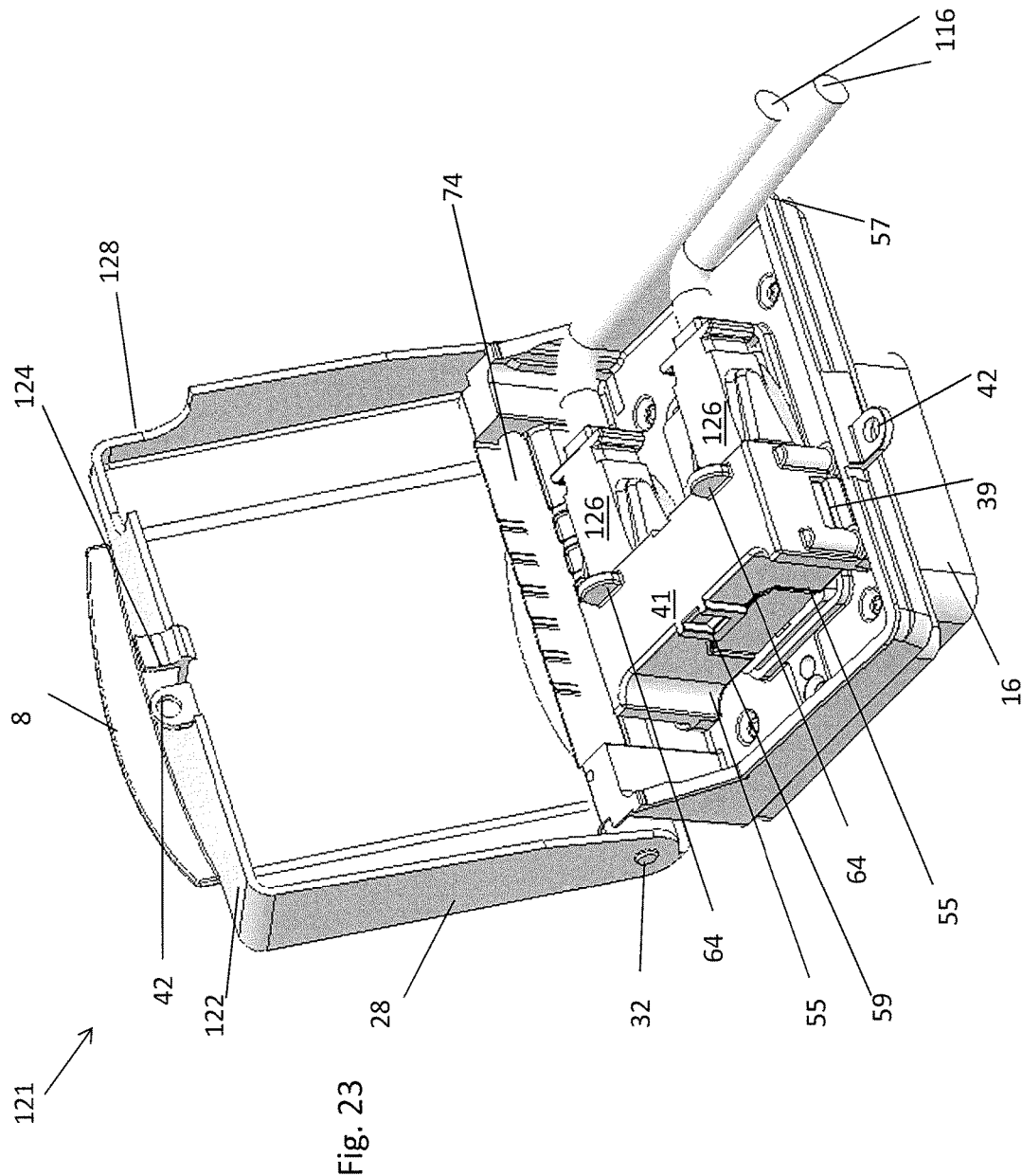
FIG. 23 is an isometric, perspective view of the while in use cover and junction box assembly of FIG. 22.
Figure 24:
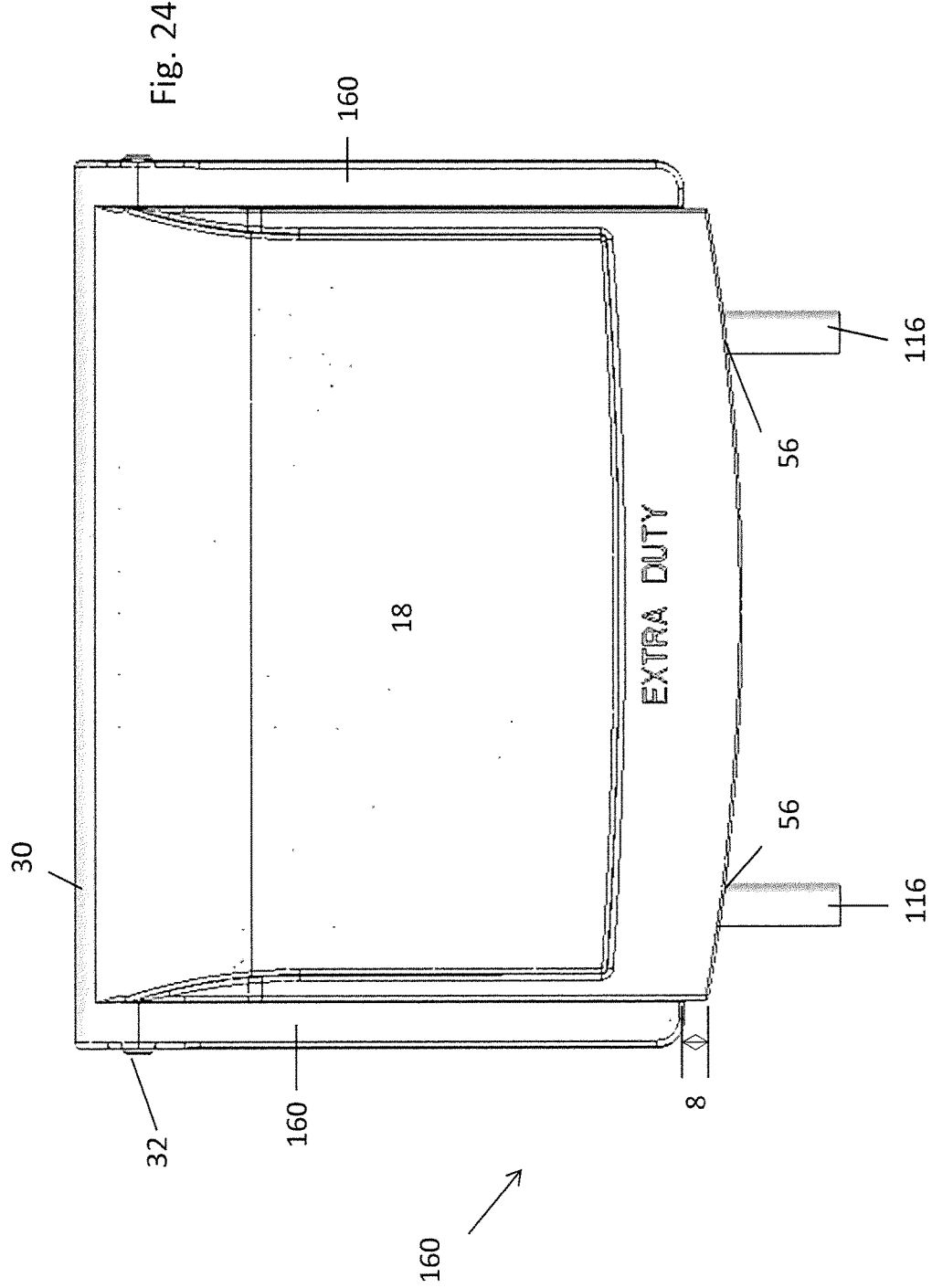
FIG. 24 is a front view of a lid of a while in use cover assembly with two in line power cord exits.
Figure 25:
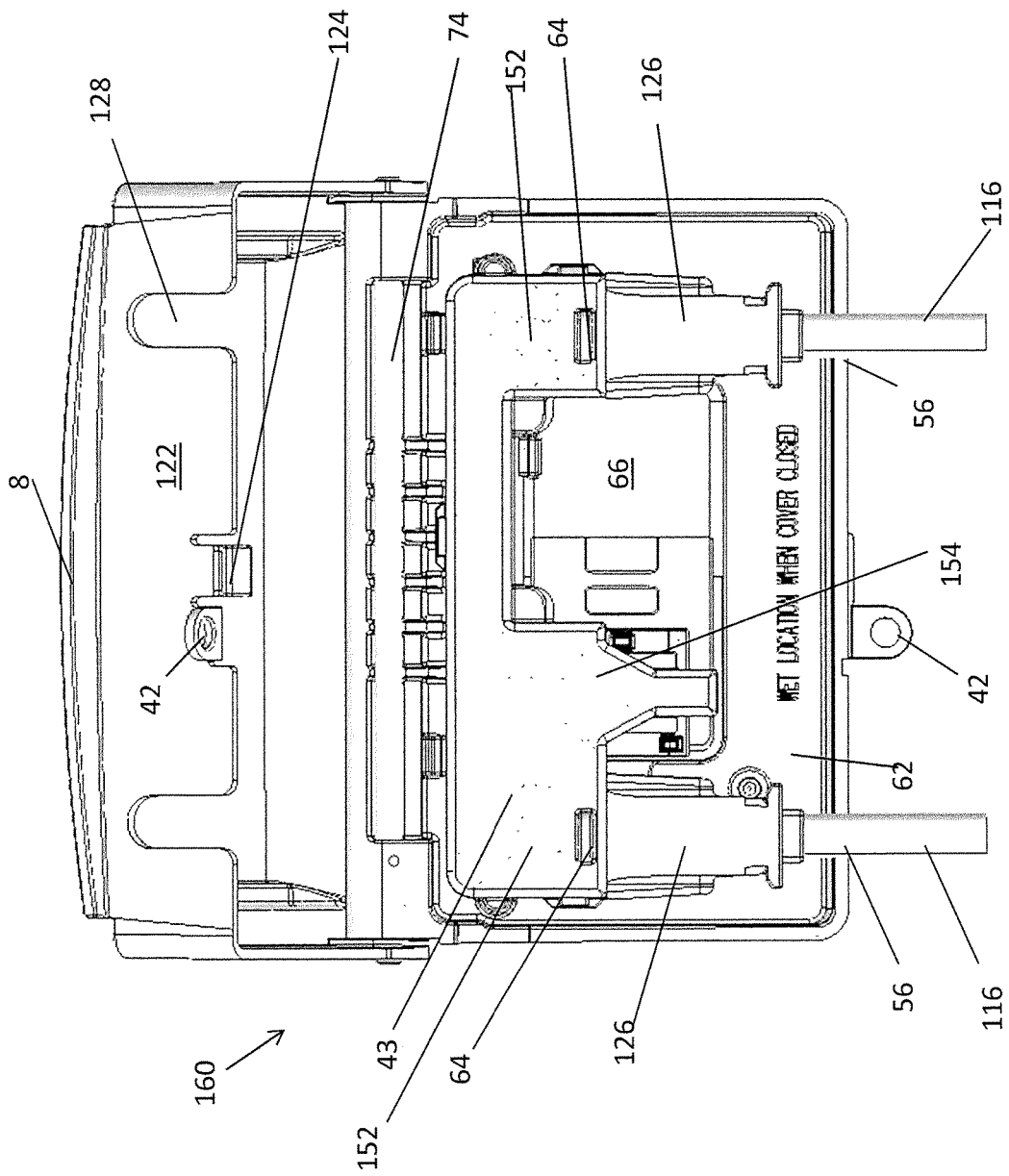
FIG. 25 is a front view of a base and interior components of the while in use cover assembly of FIG. 24.

A similar embodiment is illustrated in FIG. 20 where the current member 41 is shown. In this embodiment, the current member cover 84 includes tab 83 for mating the corresponding opening 85 present on current member housing 92. As shown in FIGS. 15-19, current member 41 can include valleys 55 connected by middle protruding portion 59. The ledge 76 and boss 78 of current member 36, 41, 43 can include any desired shaped, including, but not limited to circular, semi-circular, rectangular, square, etc.

The current member 45 can include snaps 61 that can be configured to interlock multiple current members with one another. The current member 45 can further include a channel 200 on an opposite end of the current member 45.

Figure 8:
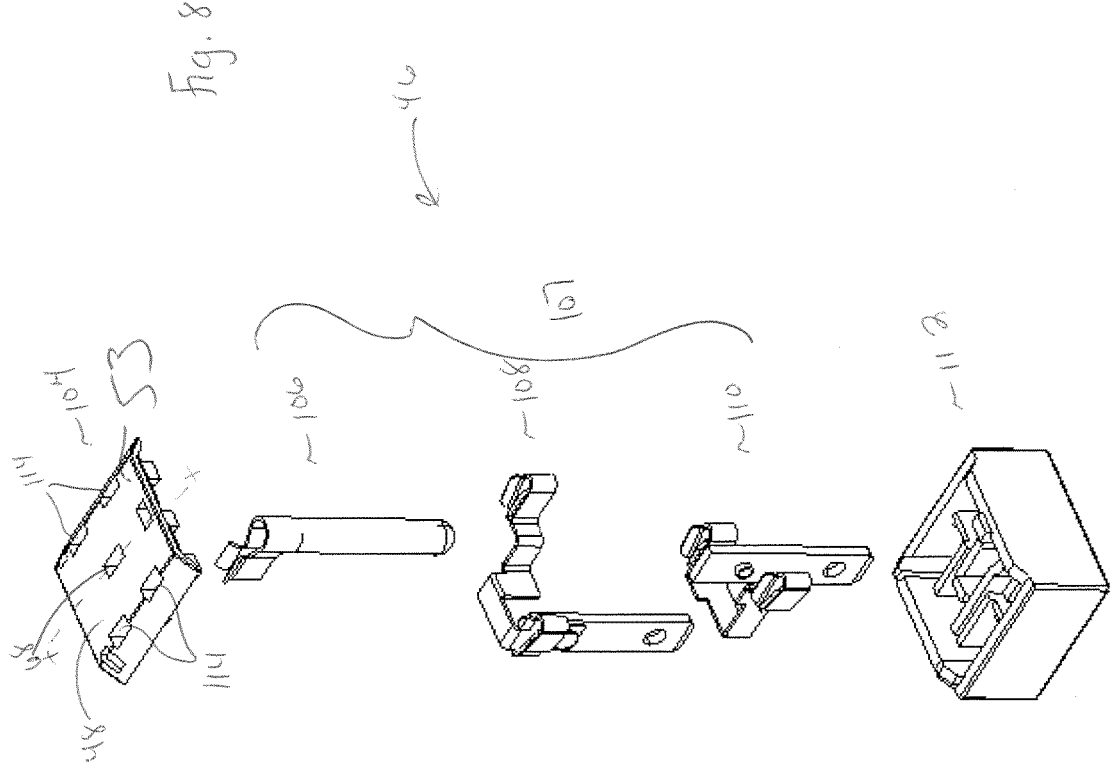
FIG. 8 is an exploded, disassembled view of an orientable adaptor of a while in use cover assembly.
Figure 9:
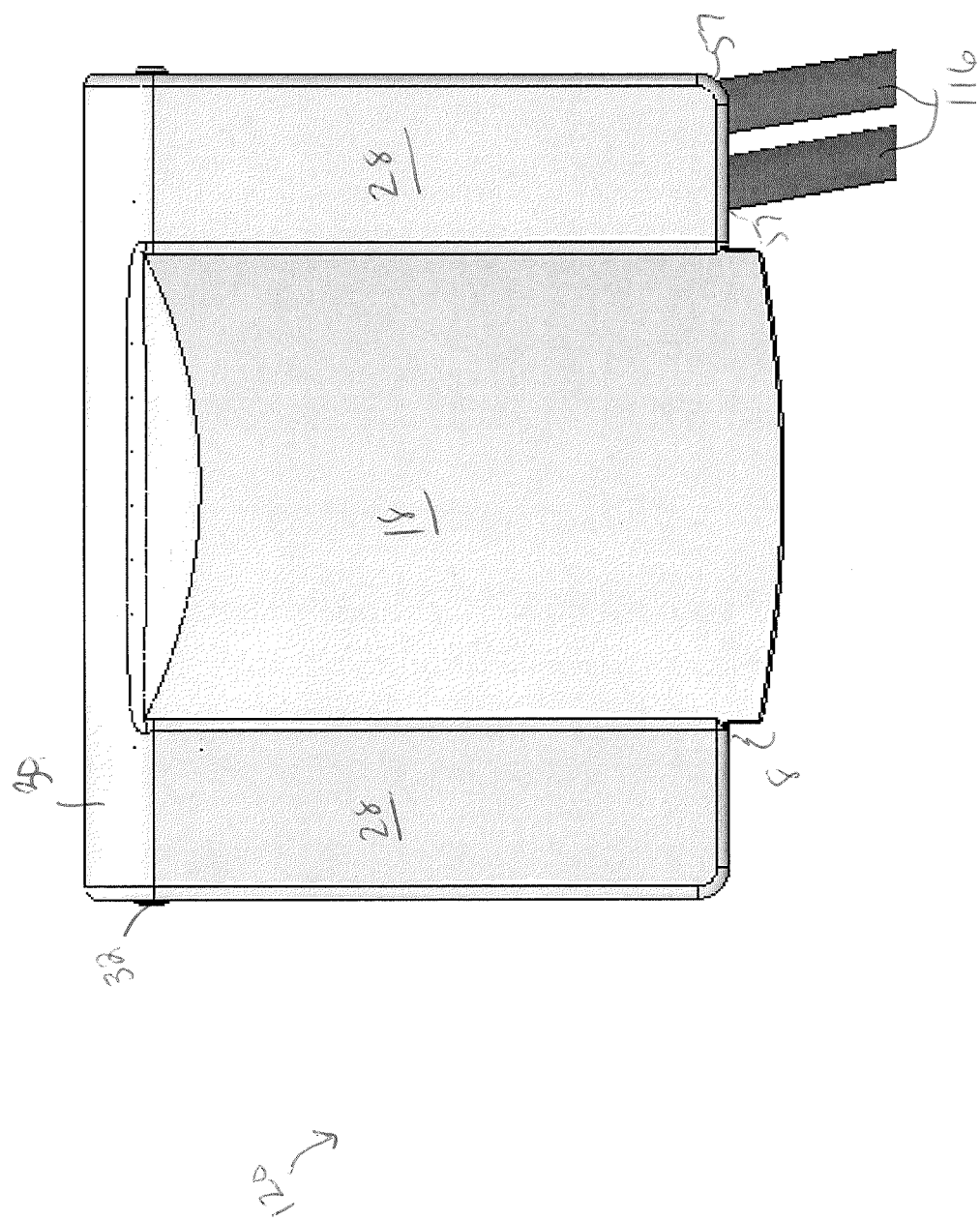
FIG. 9 is a front view of a lid of a while in use cover assembly with a corner power cord exit.
Figure 10:
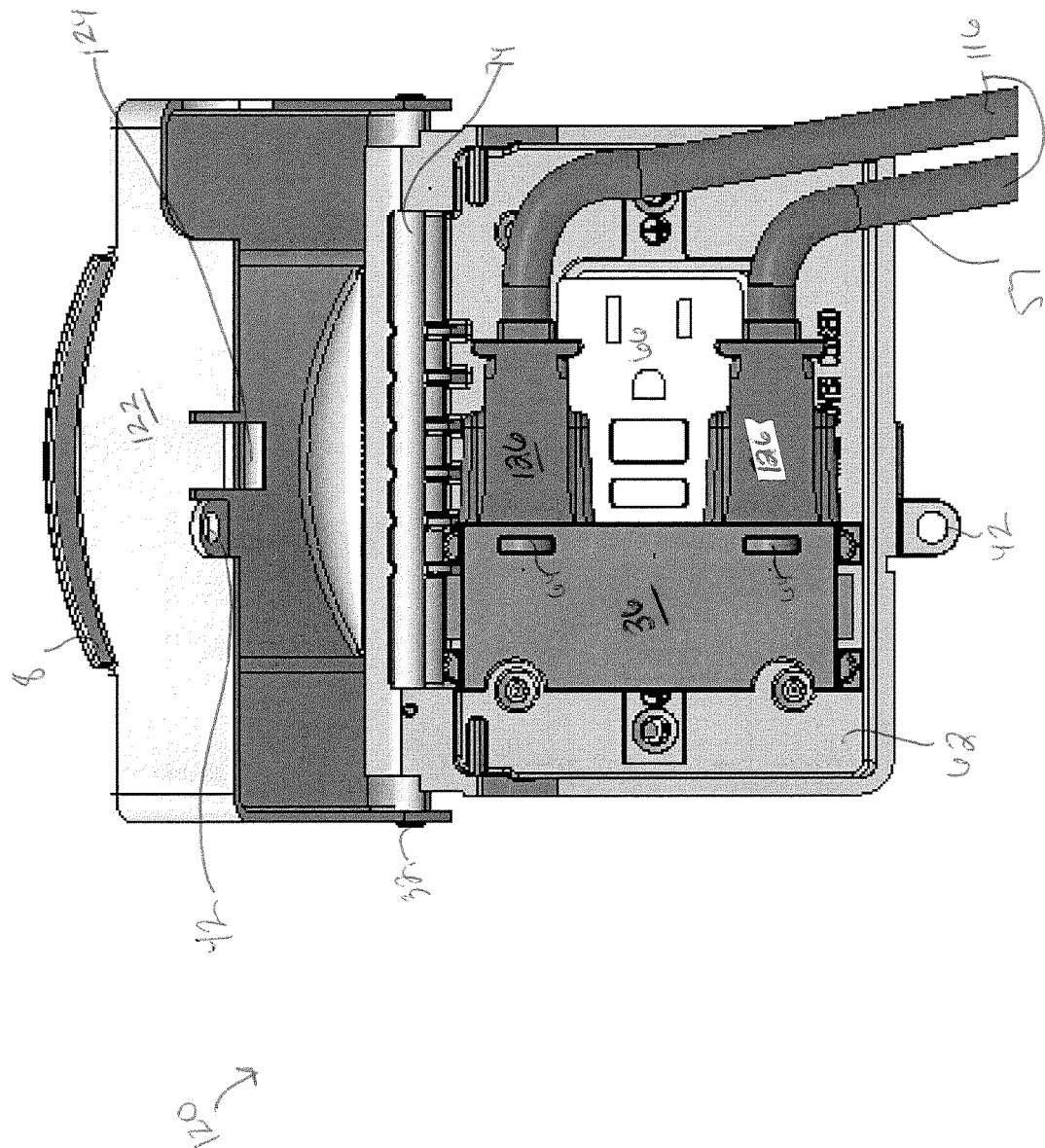
FIG. 10 is a front view of a base and interior components of the while in use cover assembly of FIG. 9.

The orientable adaptor 46, 47 can comprise an adapter housing 112 as illustrated in FIG. 8. The adapter housing 112 can, optionally, be rotatable itself, or can, optionally, comprise a rotatable cap 104 comprising the receiving side 48 of the orientable adaptor 46, 47. Rotation of the adapter housing 112 can facilitate insertion of the orientable adaptor 46, 47 into the outlet socket 66 without having to twist the power cord plug 116. The orientable adaptor 46, 47 can be symmetrical about a centerline x-x and can further comprise adaptor power elements 107, including a plug grounding terminal 106, a plug phase terminal 108, and a plug neutral terminal 110. Rotation of the adaptor housing 112 can also facilitate constant orientation of the current member 43. For example, the adaptor housing 112 can be rotated such that the plug grounding terminal 106 can be connected to an outlet socket 66 at a first position or at a second position, e.g., at an upper position or at a lower position; e.g., at a top position or at a bottom position, respective to the orientation of the ground terminal. The orientable adaptor 47 can further include a tab 37 configured to correspondingly mate with tab 39 located on current member 41.

Figure 34:
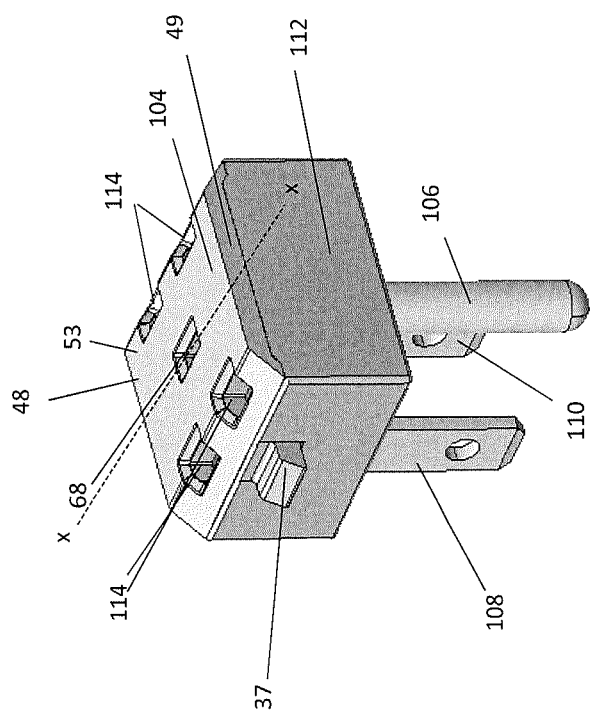
FIG. 34 is an isometric perspective view of an orientable adaptor.

Another embodiment of an orientable adapter 49 is seen in FIG. 34. As can be seen the orientable adapter 49 can include an adapter housing 112 that can, optionally, be rotatable itself, or can, optionally, comprise a rotatable cap 104 comprising the receiving side 48 of the orientable adaptor 49. Rotation of the adapter housing 112 can facilitate insertion of the orientable adaptor 49 into an outlet socket without having to twist a power cord plug. The orientable adaptor 49 can be symmetrical about a centerline x-x and can further comprise a plug grounding terminal 106, a plug phase terminal 108, and a plug neutral terminal 110. Rotation of the adaptor housing 112 can also facilitate constant orientation of the current member 45. For example, the adaptor housing 112 can be rotated such that the plug grounding terminal 106 can be connected to an outlet socket at a first position or at a second position, e.g., at an upper position or at a lower position; e.g., at a top position or at a bottom position, respective to the orientation of the ground terminal. The orientable adaptor 49 can further include a tab 37 configured to correspondingly mate with adjustable lug located on current member 45.

Turning now to FIGS. 2, 4, 5, 6, 15, 17, 18, 19, 30, and 33 the base 12 is illustrated in further detail. The base 12 can comprise a back wall 62, which can have an access port 58 that allows the orientable adaptor 46, 47 to be plugged into an outlet socket 66. The access port 58 can also allow access to an interrupter switch 136. The back wall 62 can comprise greater than or equal to one access port 58 and the access port 58 can be an equivalent size and shape to the outlet socket 66 and/or orientable adaptor 46 which will extend through the access port 58 and attach the current member 36, 41, 43, 132 to the outlet socket 66. Optionally, base 12 can have no back wall and instead, the access port 58 can extend over the full length and width of the back wall 62.

Optionally, the back wall 62 can comprise removable extension(s) 60 that can allow conversions of the access port 58 into a different size aperture, for example, so that the aperture can be used with different size sockets (e.g., duplex, GFCI, round, as well as other sockets, etc.). Although rectangular tab(s) are illustrated, it is understood that the tabs can be any shape and size to allow the access port 58 to be a size and shape that is compatible with an outlet socket with which it will be used. Alternatively, or in addition, the extension(s) 60 can be removed in order to form access port 58 in a desired location, e.g., over the upper duplex socket, the lower duplex socket, in the middle for a single socket.

The extension(s) 60 can also be designed to enable access to only a portion of the junction box 16. In other words, the back wall 62 can be designed to extend across a junction box socket that will not be used. The extension(s) 60 can be perforated or otherwise form removable tab(s) to enable its removal and conversion of the access port 58 for use with other receptacles (e.g., other sockets). As illustrated in FIG. 5, for example, the extension(s) 60 can cover one receptacle of a duplex plug so that only one orientable adaptor 46, 47 can be attached to the outlet 66 at a time. To enable visibility from the window in the lid 14, the access port 58 can be sufficiently large or the back wall 62 of the base 12 can comprise an optional additional access port to allow a user to see the status of the outlet (e.g., whether the outlet is functioning properly or requires attention because it has been tripped). The access port 58 can also give a user the capability of resetting the outlet if needed via the reset switch for a GFCI outlet.

Figure 30:
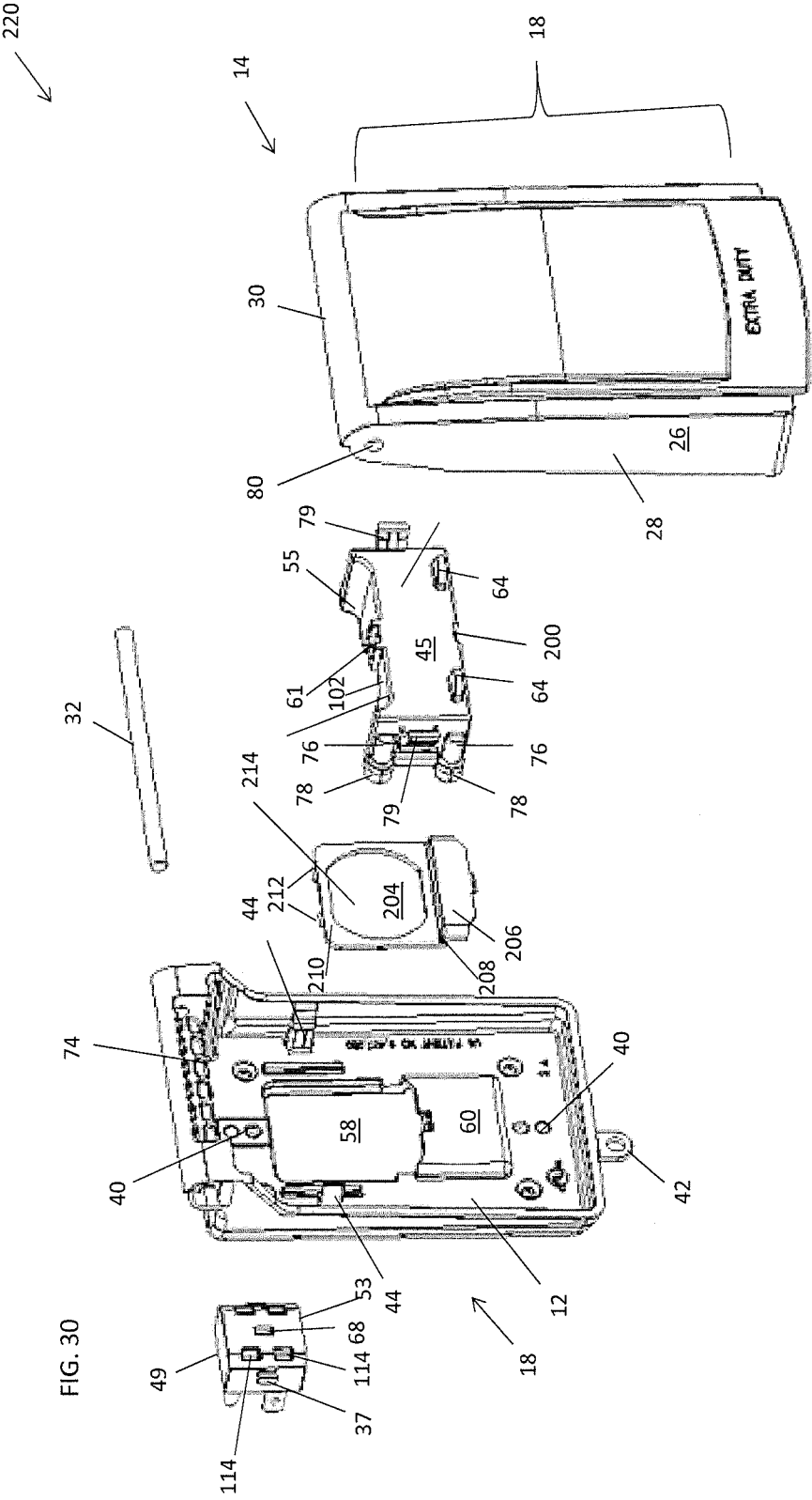
FIG. 30 is an exploded, disassembled view of a while in use cover assembly.

Optionally, a back wall adapter 204 can be attached to the back wall 62 to assist in making the while in use cover assembly 220 acceptable for use in duplex and GFCI outlets (see e.g., FIG. 30). The back wall adapter 204 can include an opening 214, tabs 212 for connection to the back wall 62, face portion 210, ledge portion 208 and extension 206.

For aesthetic reasons and ease of installation, the back wall 62 can also comprise various junction box attachment locations and/or elements. For example, junction box attachment opening(s) 40 and structure attachment opening(s) 42 can use standard holes for receiving a screw or other attachment element, a key hole slot for engaging an element on the junction box, as well as various other shapes, sizes, and amount of attachment points. If desired, the attachment point can be between the back wall and the junction box so as not to be visible when the assembly is attached to a junction box. In such an embodiment, the attachment point can be a pocket extending from the back wall toward the junction box and configured to receive the head of an attachment element extending from the junction box.

Figure 14:
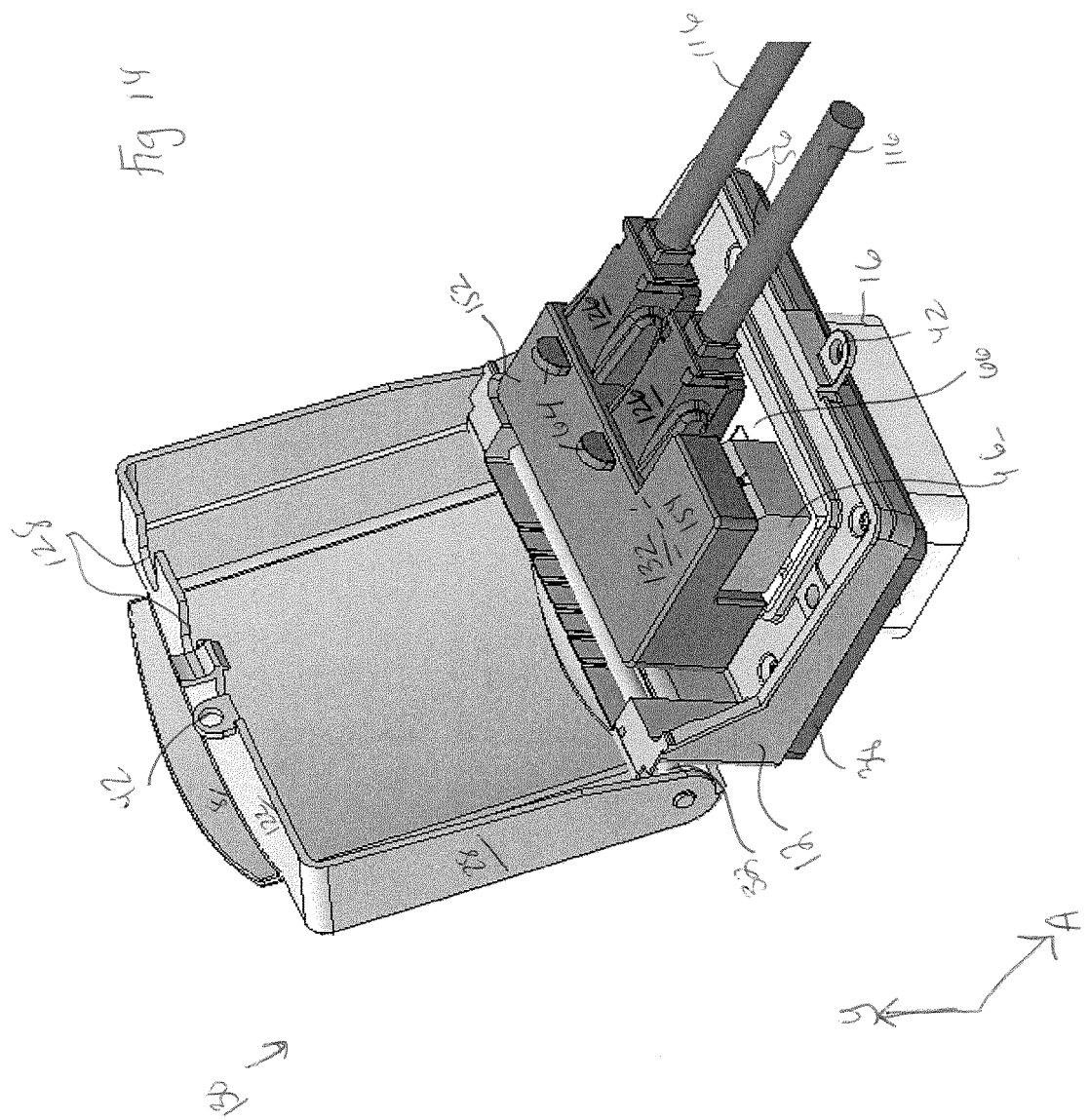
FIG. 14 is an isometric, perspective view of the while in use cover and junction box assembly of FIG. 12.
Figure 15:
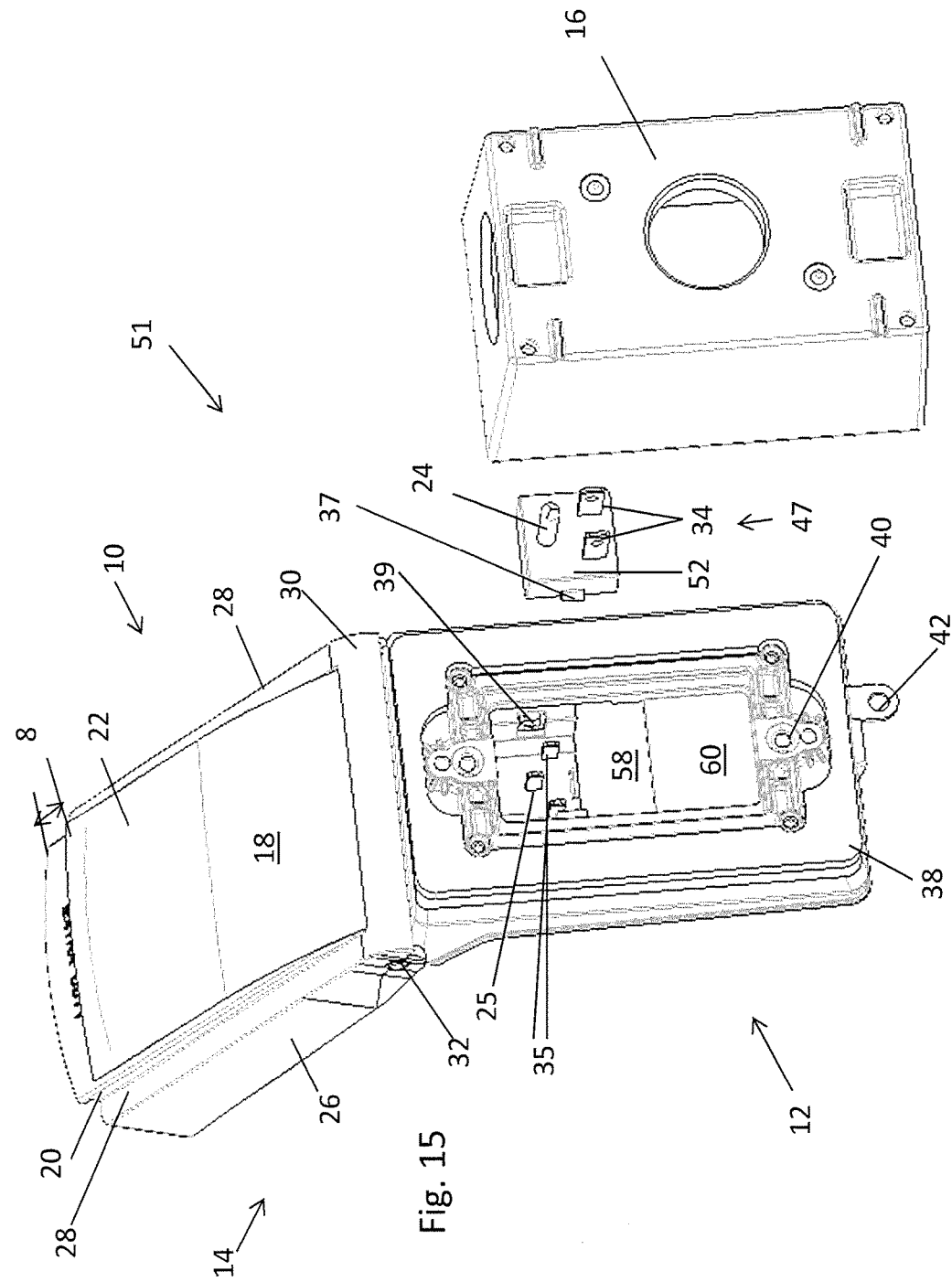
FIG. 15 is an isometric, exploded disassembled rear view of a while in use cover and junction box assembly.
Figure 16:
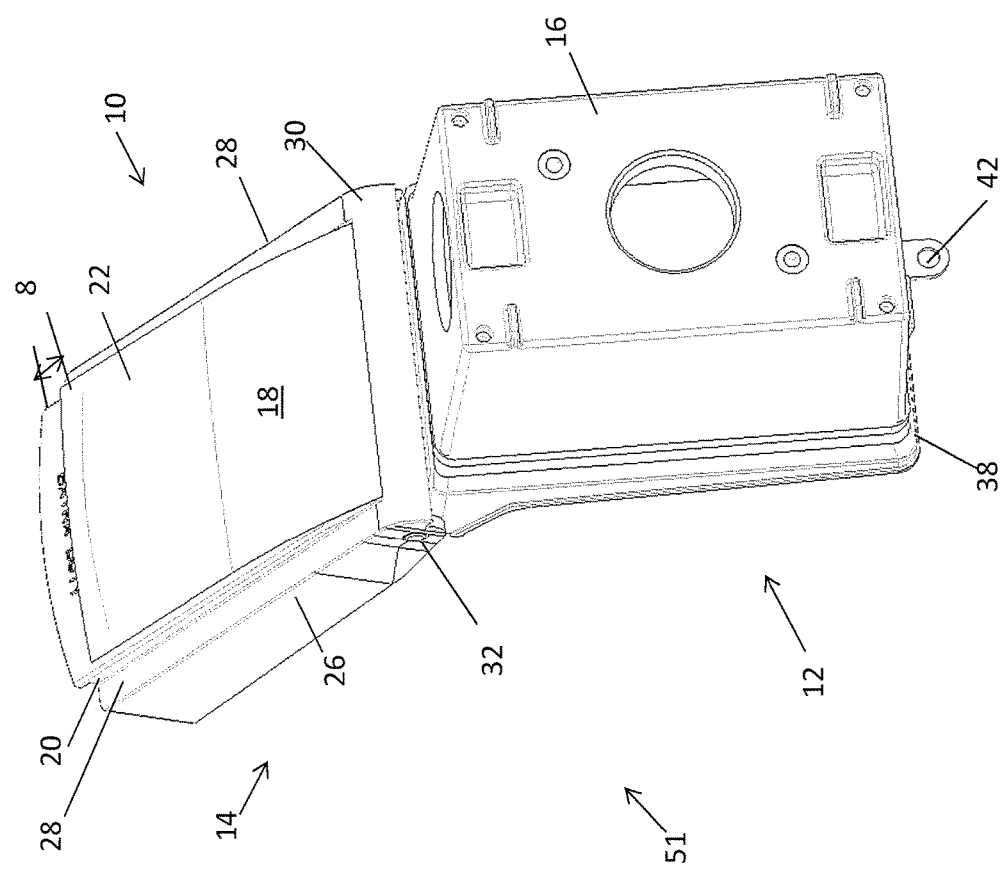
FIG. 16 is an isometric, assembled rear view of the while in use cover and junction box assembly of FIG. 15.
Figure 17:
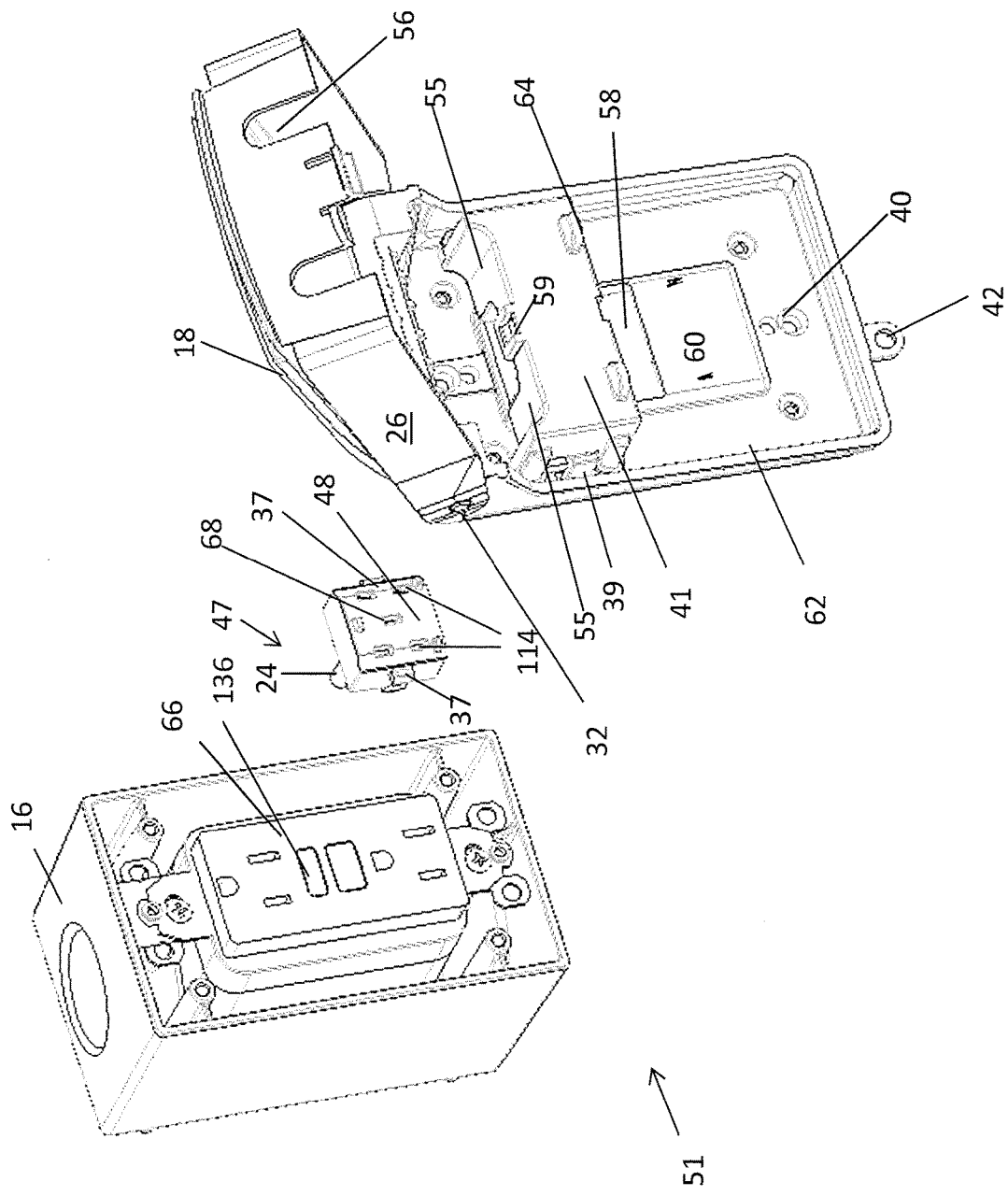
FIG. 17 is an isometric, exploded disassembled front view of the while in use cover and junction box assembly of FIG. 15.
Figure 18:
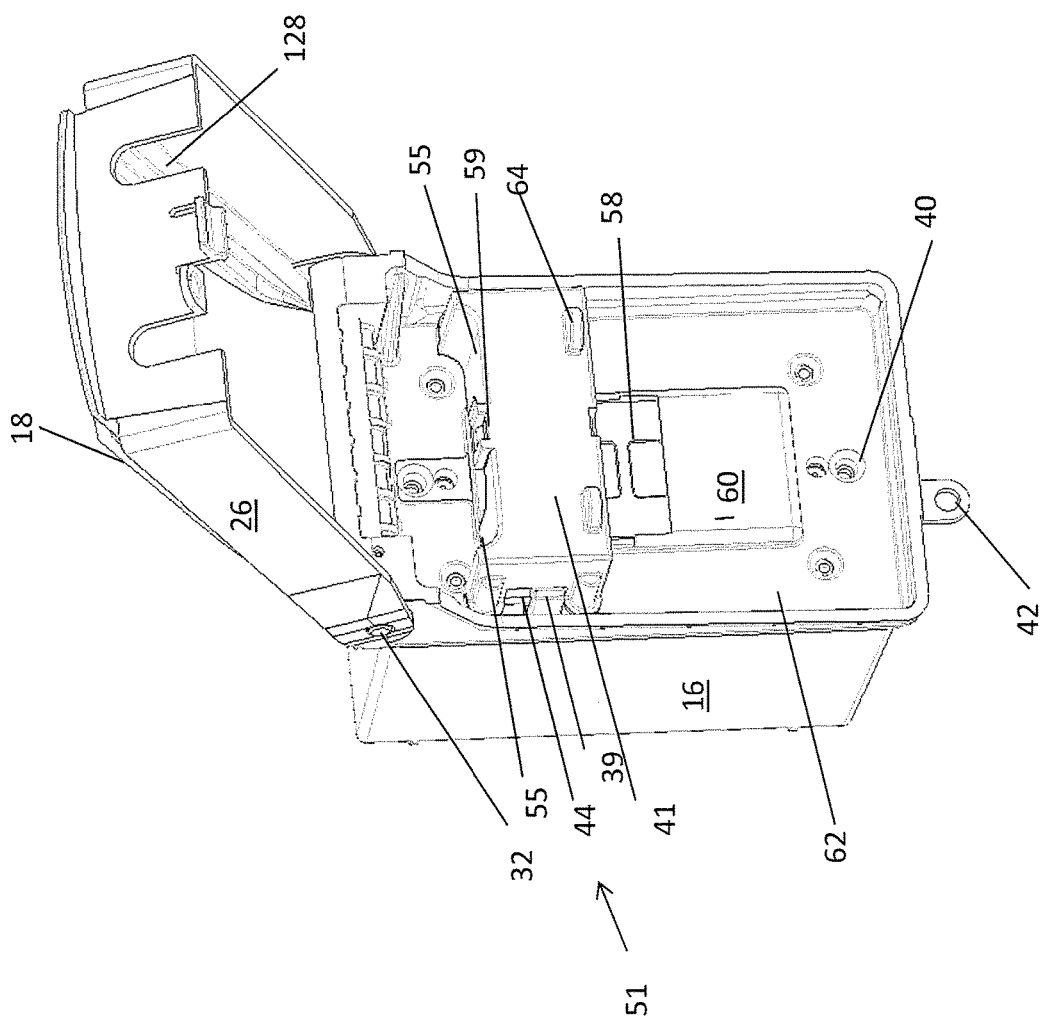
FIG. 18 is an isometric, assembled front view of the while in use cover and junction box assembly of FIG. 15.

FIGS. 2-5, 10, 11, 13, 14, 15-18, 22, 23, 25, 26, 28, and 29, illustrate the while in use cover assembly 10 in an open position. FIGS. 30 and 33 illustrate the while in use cover assembly 220 in an open position. In the open position, when the plug receiving portion 134, 152 of the current member 36, 41, 43, 45, 132 is attached to the base 12, the orientation (along axis A) of the plug receiving portion 134, 152 is at a non-parallel angle to the main axis of the base (e.g., to the base back wall 62), where the main axis extends in the y direction as illustrated in FIG. 14, e.g., the plug receiving portion 134, 152 is perpendicular to the structure to which the junction box 16 is attached. Having the plug receiving portion 134, 152 at a non-parallel angle (e.g., in a perpendicular position) while the lid is open facilitates insertion of a power cord plug 116 into the plug receiving portion 134, 152. For example, the plug receiving portion 134, 152 can contain blade apertures 98 that can be configured to receive a male socket 126. Once the power cord plug 116 has been inserted into the plug receiving portion 134, 152, the lid 14 can be closed. Optionally the lid 14 can be designed such that the weight of the power cord plug 116 can pull the lid 14 down toward the base 12, to orient the while in use cover assembly 10 into a closed position so that the lid 14 is parallel to the exterior structure to which the junction box 16 is attached (e.g., a self-closing lid). Alternatively, or in addition, the hinge member 72 can be a biased hinge (e.g., the hinge can optionally comprise a torsional spring to force the lid to a closed position) that pushes the lid 14 toward the closed position when a force is not exerted against the hinge member 72.

Also optional is a locking mechanism that can be secured to restrict access into the while in use cover assembly 10, 220 and/or that can merely assist in retaining the lid in the closed position. The locking mechanism can be of any design that restrains the lid in the closed orientation such that it does not independently move from the closed orientation. Some examples of locking mechanisms include snap connections of the lid and base, mating elements on the lid and base that can optionally receive a lock, and/or simple openings through a lip in the lid and base that can receive a lock, pin, or the like. FIGS. 22-29 demonstrate a snap fit locking mechanism where a lid attachment portion 124 is configured to mate with a base attachment portion 125 (see e.g., FIGS. 27-29 for the base attachment portion 125).

It is understood that the present design, and in particular the present while in use cover assembly 10, 220, can be used with various base and lid configurations such as a telescoping base and/or telescoping lid and/or a flexible lid that can change depth. An added advantage of the present while in use cover assembly 10, 220 is its slim profile. Whether the current member 36, 41, 43, 45, 132 is attached to the lid 14, and/or attached to the base 12, and/or is separate from the lid 14 and the base 12, the while in use cover assembly 10, 220 has a constant projection (also referred to as depth) from the junction box 16 to which it is attached when the lid is closed, whether in use (i.e., a power cord is attached) or not in use (i.e., a power cord is not attached). The while in use cover assembly 10, 220 can project from the junction box 16 less than or equal to 2.5 inches, for example, less than or equal to 2.25 inches, specifically, less than or equal to 2.0 inches, and more specifically, less than or equal to 1.9 inches, whether in use or not in use and with the lid in the closed position. A constant projection from the wall provides an aesthetic advantage to the while in use cover assemblies described herein.

The present while in use cover assembly enables conversion of a duplex outlet which enables insertion of a power plug at an angle that is parallel to the ground, to a duplex outlet that enables an inserted power plug to be oriented at an angle that is perpendicular to the ground. These assemblies can also inhibit access to an unused junction box outlet socket. In other words, the back wall 62 can allow access for the orientable adapter 46, 47, 49 to engage an outlet socket 66 while preventing access to the other outlet socket of a duplex outlet.

Methods of making and using the while in use cover assemblies disclosed herein are also contemplated. For example, a method of making a while in use cover assembly can comprise hingedly attaching a lid to a base and attaching a current member to the while in use cover assembly (e.g., attaching the current member to the lid). The current member can be a component of a cord assembly and the current member can be configured to receive a power cord plug. The while in use cover assembly can have a constant depth, when the lid is closed, when in use, and when not in use.

A method of providing electricity to a plug can comprise inserting a plug of an electrical cord into a current member that is attached to a while in use cover assembly comprising a lid hingedly attached to a base. The current member can be attached to the lid of the while in use cover assembly.

Set forth below are some examples of embodiments of the while in use cover assembly and methods for using the same.

Embodiment 1

A while in use cover assembly, comprising: a lid hingedly attached to a base having a back wall; a current member attached to the base, wherein the current member comprises a face with blade apertures configured to receive a power cord plug; and an orientable adaptor attached to the current member, wherein the orientable adaptor is symmetrical about a center line and wherein the orientable adaptor allows the current member to have a constant orientation within the base; and wherein the while in use cover assembly is configured to be attached to an outlet socket.

Embodiment 2

A while in use cover assembly, comprising: a lid hingedly attached to a base having a back wall; a current member attached to the base, wherein the current member comprises a plug receiving portion and an orientable adaptor receiving portion, wherein the orientable adaptor receiving portion is disposed perpendicularly to the plug receiving portion; and an orientable adaptor attached to the orientable adaptor receiving portion of the current member, wherein the orientable adaptor is symmetrical about a center line and wherein the orientable adaptor allows the current member to have a constant orientation within the base; wherein the while in use cover assembly has a constant depth, when the lid is closed, when in use and when not in use; and wherein, when the while in use cover assembly is in use, a power cord plug is attached to the current member, and a power cord extending from the power cord plug extends through a power cord exit while bending toward the back wall or toward the lid by less than or equal to 15 degrees as measured from an angle parallel with an axis A.

Embodiment 3

The while in use cover assembly of Claim 1 or Claim 2, wherein the orientable adaptor is configured to electrically connect to the outlet socket.

Embodiment 4

The while in use cover assembly of any of the preceding claims, wherein the orientable adaptor orientation changes according to a position of a grounding terminal on the outlet socket.

Embodiment 5

The while in use cover assembly of any of the preceding claims, wherein the back wall further comprises an orifice that enables access to an interrupter switch when the while in use cover assembly is installed on a junction box.

Embodiment 6

The while in use cover assembly of any of the preceding claims, wherein the while in use cover assembly has a depth in use and with the lid closed that is less than or equal to 2.0 inches.

Embodiment 7

The while in use cover assembly of any of the preceding claims, wherein the back wall comprises an extension sized and shaped to cover the outlet socket when the current member is attached to the outlet socket.

Embodiment 8

The while in use cover assembly of any of the preceding claims, wherein the base has a first side and a second side, wherein a length of the first side and a length of the second side can be the same or different.

Embodiment 9

The while in use cover assembly of Claim 8, wherein if the length of the first side and the second side are different, the longer side of the base can be oriented horizontally or vertically, and wherein the lid opens away from the ground in the open position regardless of whether the longer side is oriented on horizontally or vertically.

Embodiment 10

The while in use cover assembly of any of the preceding claims, wherein the orientable adaptor includes an adaptor side and a receiving side, wherein the adaptor side is configured to insert into a socket and wherein the receiving side is configured to accept an electrical plug.

Embodiment 11

The while in use cover assembly of Claim 10, wherein the adaptor side includes a grounding tab and a prong.

Embodiment 12

The while in use cover assembly of Claim 10 or Claim 11, wherein the receiving side includes a grounding aperture and blade apertures.

Embodiment 13

The while in use cover assembly of any of the preceding claims, wherein the orientable adaptor includes a cap connected to adaptor power elements, wherein the adaptor power elements are disposed in an adaptor housing and the cap is configured to cover the housing.

Embodiment 14

The while in use cover assembly of any of the preceding claims, wherein the current member includes a cover connected to current member power elements, wherein the current member power elements are disposed in a current member housing and the cap is configured to correspondingly mate with the current member housing.

Embodiment 15

The while in use cover assembly of any of the preceding claims, wherein the current member includes a plug receiving portion including a grounding aperture and blade apertures.

Embodiment 16

The while in use cover assembly of Claim 14 or Claim 15, wherein the current member cover includes a center portion with a grounding tab and a prong, wherein the center portion is configured to mate with a corresponding grounding aperture and blade aperture.

Embodiment 17

The while in use cover assembly of any of the preceding claims, wherein the base includes a gasket extending from the back wall away from the lid, wherein the gasket is sized and shaped to extend around an outer periphery of a junction box opening.

Embodiment 18

A method of using a while in use cover assembly, comprising: opening a lid of while in use cover assembly, wherein the while in use cover assembly comprises a lid hingedly attached to a base having a back wall; a current member attached to the base, wherein the current member comprises a face with blade apertures configured to receive a power cord plug; and an orientable adaptor attached to the current member, wherein the orientable adaptor is symmetrical about a center line and wherein the orientable adaptor allows the current member to have a constant orientation within the base; attaching the orientable adaptor to a socket, wherein the orientable adaptor is disposed according to a position of a grounding terminal on the socket; attaching the current member to the orientable adaptor; and attaching the while in use cover assembly to a junction box.

Embodiment 19

The method of Claim 19, wherein the orientable adaptor is disposed 180 degrees from the position of the ground terminal.

Embodiment 20

The method of Claim 18 or Claim 19, wherein the orientable adaptor orientation changes according to a position of a grounding terminal on the socket.

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). The term "or" means "and/or" unless the context clearly states otherwise. The term "removably" is intended to mean that the elements can be separated and reassembled without damage to either element. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A while in use cover assembly, comprising:
a lid hingedly attached to a base having a back wall;
a current member attached to the base, wherein the current member comprises a plug receiving portion and a orientable adaptor receiving portion, wherein the orientable adaptor receiving portion is disposed perpendicularly to the plug receiving portion; and
an orientable adaptor attached to the orientable adaptor receiving portion of the current member, wherein the orientable adaptor is symmetrical about a center line and wherein the orientable adaptor allows the current member to have a constant orientation within the base;
wherein the while in use cover assembly has a constant depth, when the lid is closed, when in use and when not in use; and
wherein, when the while in use cover assembly is in use, a power cord plug is attached to the current member, and a power cord extending from the power cord plug extends through a power cord exit while bending toward the back wall or toward the lid by less than or equal to 15 degrees as measured from an angle parallel with an axis A.

2. A while in use cover assembly, comprising:
a lid hingedly attached to a base having a back wall;
a current member attached to the base, wherein the current member comprises a face with blade apertures configured to receive a power cord plug; and
an orientable adaptor attached to the current member, wherein the orientable adaptor is symmetrical about a center line and wherein the orientable adaptor allows the current member to have a constant orientation within the base; and
wherein the while in use cover assembly is configured to be attached to an outlet socket.

3. The while in use cover assembly of claim 1, wherein the orientable adaptor is configured to electrically connect to the outlet socket.

4. The while in use cover assembly of claim 1, wherein the orientable adaptor orientation changes according to a position of a grounding terminal on the outlet socket.

5. The while in use cover assembly of claim 1, wherein the back wall further comprises an orifice that enables access to an interrupter switch when the while in use cover assembly is installed on a junction box.

6. The while in use cover assembly of claim 1, wherein the while in use cover assembly has a depth in use and with the lid closed that is less than or equal to 2.0 inches.

7. The while in use cover assembly of claim 1, wherein the back wall comprises an extension sized and shaped to cover the outlet socket when the current member is attached to the outlet socket.

8. The while in use cover assembly of claim 1, wherein the base has a first side and a second side, wherein a length of the first side and a length of the second side can be the same or different.

9. The while in use cover assembly of claim 8, wherein if the length of the first side and the second side are different, the longer side of the base can be oriented horizontally or vertically, and wherein the lid opens away from the ground in the open position regardless of whether the longer side is oriented horizontally or vertically.

10. The while in use cover assembly of claim 1, wherein the orientable adaptor includes an adaptor side and a receiving side, wherein the adaptor side is configured to insert into a socket and wherein the receiving side is configured to accept an electrical plug.

11. The while in use cover assembly of claim 10, wherein the adaptor side includes a grounding tab and a prong.

12. The while in use cover assembly of claim 10, wherein the receiving side includes a grounding aperture and blade apertures.

13. The while in use cover assembly of claim 1, wherein the orientable adaptor includes a cap connected to adaptor power elements, wherein the adaptor power elements are disposed in an adaptor housing and the cap is configured to cover the housing.

14. The while in use cover assembly of claim 1, wherein the current member includes a cover connected to current member power elements, wherein the current member power elements are disposed in a current member housing and the cap is configured to correspondingly mate with the current member housing.

15. The while in use cover assembly of claim 1, wherein the current member includes a plug receiving portion including a grounding aperture and blade apertures.

16. The while in use cover assembly of claim 14, wherein the current member cover includes a center portion with a grounding tab and a prong, wherein the center portion is configured to mate with a corresponding grounding aperture and blade aperture.

17. The while in use cover assembly of claim 1, wherein the base includes a gasket extending from the back wall away from the lid, wherein the gasket is sized and shaped to extend around an outer periphery of a junction box opening.

18. A method of using a while in use cover assembly, comprising:
opening a lid of while in use cover assembly, wherein the while in use cover assembly comprises
a lid hingedly attached to a base having a back wall;

a current member attached to the base, wherein the current member comprises a face with blade apertures configured to receive a power cord plug; and an orientable adaptor attached to the current member, wherein the orientable adaptor is symmetrical about a center line and wherein the orientable adaptor allows the current member to have a constant orientation within the base;

attaching the orientable adaptor to a socket, wherein the orientable adaptor is disposed according to a position of a grounding terminal on the socket attaching the current member to the orientable adaptor; and attaching the while in use cover assembly to a junction box.

19. The method of claim 18, wherein the orientable adaptor is disposed 180 degrees from the position of the ground terminal.

20. The method of claim 18, wherein the orientable adaptor orientation changes according to a position of a grounding terminal on the socket.

\* \* \* \* \*